United States Patent
England et al.

(10) Patent No.: US 7,777,761 B2
(45) Date of Patent: *Aug. 17, 2010

(54) METHOD AND APPARATUS FOR SPECIFYING AND DISPLAYING MEASUREMENTS WITHIN A 3D RANGEFINDER DATA SET

(75) Inventors: James N. England, Chapel Hill, NC (US); Aron T. Helser, Chapel Hill, NC (US); Benjamin C. Elgin, Hillsborough, NC (US); Richard L. Holloway, Chapel Hill, NC (US)

(73) Assignee: DeltaSphere, Inc., Durham, NC (US)

( * ) Notice: Subject to any disclaimer, the term of this patent is extended or adjusted under 35 U.S.C. 154(b) by 358 days.

This patent is subject to a terminal disclaimer.

(21) Appl. No.: 11/351,234

(22) Filed: Feb. 9, 2006

(65) Prior Publication Data

US 2006/0181527 A1 Aug. 17, 2006

Related U.S. Application Data

(60) Provisional application No. 60/652,208, filed on Feb. 11, 2005.

(51) Int. Cl.
*G06T 7/00* (2006.01)
(52) U.S. Cl. ........................ 345/619; 382/291; 382/294
(58) Field of Classification Search ........................ None
See application file for complete search history.

(56) References Cited

U.S. PATENT DOCUMENTS

| | | | |
|---|---|---|---|
| 4,418,361 A | 11/1983 | Bagnall-Wild et al. | |
| 5,309,212 A | 5/1994 | Clark | |
| 5,488,952 A | 2/1996 | Schoolman | |
| 5,557,711 A | 9/1996 | Malzbender | |
| 5,577,130 A | 11/1996 | Wu | |
| 5,633,951 A * | 5/1997 | Moshfeghi | 382/154 |
| 5,694,530 A | 12/1997 | Goto | |
| 5,715,166 A | 2/1998 | Besl | |
| 5,734,384 A * | 3/1998 | Yanof et al. | 345/424 |
| RE35,798 E | 5/1998 | Kimura | |
| 5,764,280 A | 6/1998 | Bloom et al. | |

(Continued)

OTHER PUBLICATIONS

Jensen et al. Subpixel Edge Localization and the Interpolation of Still Images. IEEE Transactions on Image Processing. vol. 4. Issue 3. 1995.*

(Continued)

*Primary Examiner*—Peter-Anthony Pappas
(74) *Attorney, Agent, or Firm*—Jenkins, Wilson, Taylor & Hunt, P.A.

(57) ABSTRACT

A method, computer program product, and apparatus for specifying, making, and displaying measurements within a 3D range data set obtained using a 3D rangefinder device. A 3D range data set is provided and represented as a first 2D displayed image and a second displayed image. The second displayed image is selected from the group consisting of a second 2D displayed image and a 3D displayed image. At least one feature is identified in the first 2D displayed image and the second displayed image, such that a measurement can be computed based on the identified features. The computed measurement is displayed in at least one of the first 2D displayed image and the second displayed image.

19 Claims, 13 Drawing Sheets

(8 of 13 Drawing Sheet(s) Filed in Color)

U.S. PATENT DOCUMENTS

| | | | |
|---|---|---|---|
| 5,878,152 A | 3/1999 | Sussman | |
| 5,986,662 A | 11/1999 | Argiro et al. | |
| 5,988,862 A | 11/1999 | Kacyra | |
| 6,009,212 A * | 12/1999 | Miller et al. | 382/294 |
| 6,009,359 A * | 12/1999 | El-Hakim et al. | 701/28 |
| 6,049,622 A | 4/2000 | Robb et al. | |
| 6,083,162 A * | 7/2000 | Vining | 600/407 |
| 6,246,468 B1 * | 6/2001 | Dimsdale | 356/4.02 |
| 6,246,898 B1 * | 6/2001 | Vesely et al. | 600/424 |
| 6,346,940 B1 * | 2/2002 | Fukunaga | 345/427 |
| 6,480,270 B1 | 11/2002 | Studnicka et al. | |
| 6,483,950 B1 | 11/2002 | Wallack | |
| 6,484,048 B1 | 11/2002 | Hoshino et al. | |
| 6,512,518 B2 * | 1/2003 | Dimsdale | 345/427 |
| 6,553,152 B1 * | 4/2003 | Miller et al. | 382/294 |
| 6,590,640 B1 * | 7/2003 | Aiken et al. | 356/3.01 |
| 6,628,279 B1 * | 9/2003 | Schell et al. | 345/420 |
| 6,704,099 B2 | 3/2004 | Uomori et al. | |
| 6,717,654 B1 | 4/2004 | Rajchel et al. | |
| 6,759,979 B2 * | 7/2004 | Vashisth et al. | 342/357.13 |
| 6,915,008 B2 | 7/2005 | Barman et al. | |
| 6,922,234 B2 | 7/2005 | Hoffman | |
| 6,952,204 B2 * | 10/2005 | Baumberg et al. | 345/420 |
| 6,970,591 B1 | 11/2005 | Lyons et al. | |
| 6,980,690 B1 * | 12/2005 | Taylor et al. | 382/154 |
| 6,992,685 B2 * | 1/2006 | Hallbauer et al. | 345/619 |
| 7,010,175 B2 * | 3/2006 | Barfuss et al. | 382/294 |
| 7,054,793 B2 * | 5/2006 | Moritz et al. | 703/1 |
| 7,177,486 B2 * | 2/2007 | Stewart et al. | 382/294 |
| 7,206,462 B1 * | 4/2007 | Betke et al. | 382/280 |
| 7,215,430 B2 * | 5/2007 | Kacyra et al. | 356/601 |
| 7,247,825 B2 | 7/2007 | Sönksen et al. | |
| 7,274,811 B2 * | 9/2007 | Sirohey et al. | 382/128 |
| 7,403,268 B2 | 7/2008 | England et al. | |
| 7,477,359 B2 | 1/2009 | England et al. | |
| 7,477,360 B2 | 1/2009 | England et al. | |
| 7,485,041 B2 | 2/2009 | Katsuragawa et al. | |
| 7,551,771 B2 | 6/2009 | England, III | |
| 2005/0028111 A1 * | 2/2005 | Schrag et al. | 715/851 |
| 2005/0280714 A1 | 12/2005 | Freeman | |
| 2006/0034513 A1 * | 2/2006 | Cai et al. | 382/173 |
| 2006/0115133 A1 | 6/2006 | Potter et al. | |
| 2006/0182314 A1 | 8/2006 | England et al. | |
| 2006/0193521 A1 | 8/2006 | England et al. | |
| 2006/0244746 A1 | 11/2006 | England et al. | |
| 2007/0064976 A1 | 3/2007 | England, III | |

OTHER PUBLICATIONS

Han. Feature Recognition from CAD Models. IEEE Computer Graphics and Applications. 1998.*

Boyd. Limited-Angle Computed Tomography for Sandwich Structures Using Data Fusion. Journal of Nondestructive Evaluation. vol. 14. No. 2. Jun. 1995.*

Acuity Research, "AccuRange 4000, Accurange High Speed Interface, Accurange Line Scanner User's Manual", product manual, Dec. 15, 1999, Menlo Park CA.

Acuity Research, "AccuRange 4000 laser rangefinder", product literature, URL http://www.acuityresearch.com/pdf/ar4000-datasheet.pdf, Feb. 10, 2005.

Leica Geosystems, "Leica Cyclone 5.4 Technical Specifications", product literature, URL http://www.leica-geosystems.com/hds/en/Cyclone_5.4_Technical_Specifications.pdf, Mar. 15, 2006.

3rdTech Inc, "DeltaSphere 3000 Laser 3D Scene Digitizer", product literature, Jun. 22, 2000.

3rdTech Inc, "Revolutionary 3D Scene Capture, Viewing and Analysis", product literature, URL http://www.deltasphere.com/images/deltaspheredatasheet_112204s.pdf, Nov. 22, 2004.

Nyland et al., "Capturing, Processing and Rendering Real-World Scenes", Videometrics and Optical Methods for 3D Shape Measurement, Electronic Imaging 2001, Photonics West, SPIE vol. 4309 Jan. 22, 2001.

Canesta Inc., "Development Platform DP100", Jun. 26, 2003.

Canesta Inc., "CanestaVision Chips", URL http://www.canesta.com/html/sensors.htm, 2006.

Gokturk et al., "A Time-of-Flight Depth Sensor—System Description, Issues and Solutions" 2004 Conference on Computer Vision and Pattern Recognition Workshop (CVPRW'04) vol. 3.

Tsai, "An Efficient and Accurate Camera Calibration Technique for 3D Machine Vision", Proceedings of IEEE Conference on Computer Vision and Pattern Recognition, Miami Beach, FL, pp. 364-374, 1986.

Turk et al., "Zippered polygon meshes from range images", Computer Graphics, ACM SIGGRAPH 94 Proceedings, Orlando, Fla., pp. 311-318, 1994.

Innovmetric Inc., "PolyWorks Total Point Cloud Inspection and Reverse-Engineering Software Solution", product literature, URL http://www.innovmetric.com/Manufacturing/pdf/brochureWeb.pdf, 2003.

Besl et al., "A Method for Registration of 3-D Shapes", IEEE Transactions on Pattern Analysis and Machine Intelligence, vol. 14 (1992), No. 2, 239-256.

Bernardini et al., "The 3D Model Acquisition Pipeline" vol. 21 (2002), No. 2 pp. 149-172, Computer Graphics forum.

Faugeras et al., "The representation, recognition, and locating of 3-d objects", International Journal of Robotic Research, 5(3):27-52, Fall 1986.

Arun et al., "Least-Squares Fitting of Two 3D Point Sets", in IEEE Transactions on Pattern Analysis and Machine Intelligence, vol. 9 (1987), 698-700.

Acuity Research, "Accurange Line Scanner", product literature, URL http://www.acuityresearch.com/pdf/line-scanner-data-sheet.pdf, Oct. 17, 2005.

3rdTech Inc., "SceneVision-3D Functions", product literature, URL http://www.deltasphere.com/scenevision_specs.htm, Feb. 28, 2006.

Notice of Allowance and Fee(s) Due in U.S. Appl. No. 11/351,248 (Sep. 29, 2008).

Notice of Allowance and Fee(s) Due in U.S. Appl. No. 11/351,246 (Sep. 4, 2008).

Non-Final Official Action in U.S. Appl. No. 11/523,292 (Jul. 7, 2008).

Notice of Allowance and Fee(s) Due in U.S. Appl. No. 11/351,235 (Mar. 31, 2008).

Non-Final Official Action in U.S. Appl. No. 11/351,248 (Jan. 23, 2008).

Non-Final Official Action in U.S.Appl. No. 11/351,246 (Jan. 22, 2008).

Non-Final Official Action in U.S. Appl. No. 11/351,235 (Nov. 6, 2007).

Notification of Transmittal of the International Search Report and the Written Opinion of the International Searching Authority, or the Declaration for International Application No. PCT/US06/36459 (Oct. 23, 2007).

Ellekilde et al., "Fusing Range and Intensity Images for Generating Dense Models of Three-Dimensional Environments," Proceedings of the 2006 IEE International Conference on Man-Machine Systems (Sep. 2006).

Kil et al., "Laser Scanner Super-resolution," Eurographics Symposium on Point-Based Graphics (Jul. 29-30, 2006).

Oggier et al., "SwissRanger SR3000 and First Experiences based on Miniaturized 3D-TOF Cameras," Proceedings of the $1^{st}$ Range Imaging Research Day at ETH Zurich, Switzerland (Sep. 8-9, 2005).

Stone et al., "Performance Analysis of Next-Generation LADAR for Manufacturing, Construction, and Mobility," National Institutes of Standards and Technology NISTIR 7117 (May 2004).

Gokturk et al., "A Time-of-Flight Depth Sensor—System Description, Issues and Solutions," IEEE Conference on Computer Vision and Pattern Recognition Workshop (2004).

Park et al., "Super-Resolution Image Reconstruction: A Technical Overview," IEEE Signal Processing Magazine (May 2003).

Non-Final Office Action for U.S. Appl. No. 11/351,245 (Jul. 28, 2009).
Notice of Allowance and Fee(s) Due for U.S. Appl. No. 11/523,292 (Feb. 19, 2009).

Office Action for U.S. Appl. No. 11/351,245 (Feb. 17, 2009).
Interview Summary for U.S. Appl. No. 11/523,292 (Jan. 9, 2009).

* cited by examiner

METHOD AND APPARATUS FOR SPECIFYING AND DISPLAYING MEASUREMENTS WITHIN A 3D RANGEFINDER DATA SET

CROSS REFERENCE TO RELATED APPLICATIONS

This patent application claims the benefit of U.S. provisional application Ser. No. 60/652,208 filed Feb. 11, 2005, the entire contents of which are incorporated by reference herein.

FIELD OF THE INVENTION

The present invention relates to 3D rangefinder processing technology generally, and more particularly relates to methods, computer program products, and apparatus for specifying and displaying measurements within a 3D rangefinder data set.

BACKGROUND OF THE INVENTION

A rangefinder is a device for measuring the range from the device to some physical surface. A laser rangefinder can be one of many known types of rangefinders. Laser rangefinders are sometimes known as LIDAR (Light Detection and Ranging) or LADAR (Laser Detection and Ranging) systems. Laser rangefinders use a variety of techniques to measure the range from the apparatus to a surface from which the laser beam is reflected. A typical apparatus may in some manner measure the round trip time-of-flight of the beam from the apparatus's emitter to the target, or the reflector, and back to the apparatus's receiver. One such apparatus is generally commercially available from Acuity Research and known as the AR4000 laser rangefinder, which can be found at URL http:/www.acuityresearch.com, for example. Information on example laser rangefinder technology can be found in U.S. Pat. No. 5,309,212 which describes establishing an oscillator whose frequency is dependent on the time-of-flight of the laser beam and then measuring the time period of that oscillator. Since the speed of light is known, this time period measurement can then be readily converted to indicate the range from the apparatus to a surface that reflects the laser beam. A digital interface to a computer is typically included in such rangefinders. Other examples of laser and other rangefinders can be found in the text "Sensors for Mobile Robots: Theory and Application" by H. R. Everett (A. K. Peters, Ltd., 1995).

A rangefinder's laser beam may be directed in various directions by physically pointing the apparatus, by using one or more moving mirrors or prisms under manual or computer control, or both. A common configuration scans the beam in one plane and is called a line scanner, such as that sold commercially by Acuity Research and found at their website, for example. This apparatus includes a laser rangefinder that directs the beam end-on toward a rotating 45-degree mirror. The beam is thus turned at 90 degrees and sweeps out an arc as the 45-degree mirror rotates. The resulting data is a set of range data points representing the profile of an object or space. For example, if the scanned beam is directed at an automobile, a set of data points representing a profile of the automobile is produced.

The rangefinder's laser beam may also be directed to scan in two dimensions by physically pointing the apparatus, by using one or more moving mirrors or prisms, or both. As such the rangefinder's laser beam can thus acquire range measurements to a host of points within the environment. This type of apparatus is sometimes referred to as a scanning 3D laser rangefinder or just scanning laser rangefinder. In general, the three dimensions comprise two dimensions of scanning, such as X and Y, plus range or distance between the rangefinder and a point in space at which the laser beam is directed.

In order to acquire the range measurements to multiple points within an area, the rangefinder beam may be steered under manual or computer control. The steering may be accomplished directly through physical movement or optically through the use of mirrors or prisms. A scanning laser rangefinder sweeps the beam in two directions to cover an area. For example, a scanning laser rangefinder developed by Cyra Technologies Inc. sweeps the beam in an X, Y raster pattern through the use of mirrors. Information on the Cyra rangefinder technology is disclosed in U.S. Pat. No. 5,988,862. As a further example, we discuss the DeltaSphere 3000 laser scanner, such as 100 shown in FIG. 1. As seen, the laser scanner mounts on a tripod 105, includes a laser rangefinder 140, and is controlled by an embedded computer 150. The laser scanner sweeps the laser beam 110 in elevation using a rotating 45-degree mirror 120 and in azimuth by rotating 130 the laser and mirror assembly. Information on the DeltaSphere 3000 laser scanner product can be found at URL http://www.deltasphere.com. Further background on the technology for the DeltaSphere 3000 laser scanner can be found in "Capturing, Processing and Rendering Real-World Scenes", Videometrics and Optical Methods for 3D Shape Measurement, Electronic Imaging 2001, Photonics West, SPIE Vol. 4309 Jan. 22, 2001, an article by Lars Nyland, Anselmo Lastra, David K. McAllister, Voicu Popescu, and Chris McCue.

Other examples of scanning laser rangefinders can be found in "Sensors for Mobile Robots: Theory and Application" by H. R. Everett (A. K. Peters, Ltd., 1995). The results of these scans are 3D data sets sometimes referred to as "3D point clouds". Similar data is provided by a rangefinder array design, such as those made commercially by Canesta Inc., also known as a range camera, that enables measurement of multiple range points at once. Information may be found at URL http://www.canesta.com/.

Various 3D rangefinder technologies may collect data at various rates ranging from 1 sample per second to several hundred thousand samples per second, but all provide essentially the same results, an array of 3D points where at least the range, elevation, and azimuth for each point is known. This representation in spherical coordinates may easily be transformed to X, Y, Z values in Cartesian coordinates. The rate of collecting the data points determines the time required to capture the data in the field, but obviously has no impact on later processing and use of the data. It will be clear that the methods discussed in this invention are independent of the speed of capture of the original data and that the methods apply to all forms of 3D rangefinder devices.

3D data sets collected by a 3D rangefinder may be presented as a visual display to a user in several different ways. The visualization techniques fall broadly into two classes, 3D displayed images and 2D displayed images.

A 3D displayed image format is one in which the user may select a particular 3D viewpoint and then view the 3D range data as geometric figures in perspective projection or in orthogonal projection or via some other projection within a 2D computer image. Techniques for creating 3D displayed images are well known from computer graphics textbooks such as "Computer Graphics: Principles and Practice in C" by James D. Foley, Andries van Dam, Steven K. Feiner, and John F. Hughes (Addison Wesley 1995). Well-known formats for a 3D displayed image may have the 3D range data samples represented as 3D points (also known as a point cloud) in which the same color is assigned to all points, in which false color is assigned to each point based on its range, in which color is assigned to each point based on its reflectance intensity (strength of the signal returned from a surface to the 3D rangefinder), or in which points are colored via any other scheme. In another well-known 3D display technique, the 3D range data points may be linked together into a 3D mesh using well known computer graphics techniques, such that neighboring points are connected via lines within the display. The lines of the mesh may be colored using any of the techniques discussed above using well-known computer graphics techniques. In another 3D display technique, the 3D range data points may be linked together into a surface using well known computer graphics techniques. The surface may have range values interpolated between actual data points using linear, quadratic, cubic, or any well-known surface interpolation technique. The color of the surface at each displayed pixel may be determined in any of a number of well-known ways, including computing simulated lighting effects based on the orientation of the interpolated surface, interpolating reflectance intensity values measured at each data point, mapping a 2D image or any other function to the 3D surface using well-known texture-mapping techniques, combinations thereof, or any using other well-known techniques for surface rendering.

A 2D displayed image is one in which the 3D range data set is inherently represented as a 2D image. There are several well-known techniques for creating 2D displayed images since the data from a typical 3D rangefinder is obtained by scanning in two dimensions, typically azimuth and elevation. The resulting data can naturally be represented as a 2D image in spherical projection, where the azimuth angle of a 3D sample is represented as the horizontal or X axis and the elevation angle is represented as the vertical or Y axis on the display, and each pixel represents one or more 3D data points depending on the scale chosen. Of course, the 2D displayed image need not be represented in spherical projection, but in any other well-known projection of a 3D data set to a 2D display. As illustrated in FIG. 2, for example, each pixel may have a multiplicity of associated values stored with it, including precise azimuth angle value 210, precise elevation angle value 220, range value 230, reflectance value 240, color 250 (RGB), and any other useful values 260. For example, a useful value might be some other attribute associated with the pixel. The color of each pixel within the 2D displayed image may be determined in any of a number of well-known formats. A Range Image has a false color assigned to each pixel based on its range. A Reflectance Image has a color assigned to each pixel based on the intensity of the reflected laser beam. A Registered Color Image has a color assigned to each pixel based on the color obtained from a color sensor such as a 2D digital camera such that the range data and color data are aligned as shown in FIG. 3. A Registered Color Image may typically be created by the steps of capturing a 3D range data set with a 3D rangefinder and displaying it as a Reflectance Image 310, capturing a 2D image using a calibrated digital color camera and displaying it as a 2D color image 320, identifying corresponding features between the two 2D images such as 311 and 321, 312 and 322, 313 and 323, and 314 and 324, using the locations of the corresponding features to compute the pose (location and orientation) of the 2D digital color camera, using the camera pose information to compute the optical path from the camera into the 3D data set, and applying the color from each pixel of the 2D color image to corresponding points of the 3D data set displayed as a 2D image. Using this method, the 3D range data and 2D color image need not have been acquired from the same viewpoint. Further information on the mathematics underlying the 2D image registration process may be found in an article by R. Y. Tsai, "An Efficient and Accurate Camera Calibration Technique for 3D Machine Vision", Proceedings of IEEE Conference on Computer Vision and Pattern Recognition, Miami Beach, Fla., pp. 364-374, 1986.

Examples of a Range Image, a Reflectance Image, and a Registered Color Image may be found in an article by Lars Nyland, Anselmo Lastra, David K. McAllister, Voicu Popescu, and Chris McCue, titled "Capturing, Processing and Rendering Real-World Scenes", Videometrics and Optical Methods for 3D Shape Measurement, Electronic Imaging 2001, Photonics West, SPIE Vol. 4309 Jan. 22, 2001. The ability to create and display a Range Image, a Reflectance Image, and a Registered Color Image has been available in the DsControl, DsColor, and other software provided to DeltaSphere 3000 customers beginning some time ago.

When the 3D data set is displayed in any of the above formats, it is a well-known technique for a user to interactively select a particular pixel on the screen and to determine the X, Y, Z coordinates of the data represented at that pixel. In 2D displayed images, for example, the ability to select and display the X, Y, Z coordinates for any point in a Range Image, a Reflectance Image, and a Registered Color Image has been available in the DsControl and other software provided to DeltaSphere 3000 customers beginning some time ago. For 3D displayed images, commonly used computer graphics and computer-aided design software packages have enabled a user to pick a point, a point on a mesh, or a point on a surface and determine the X, Y, Z coordinates of that point. As another example, U.S. Pat. No. 6,922,234 discloses methods of making measurements within a reflectance image obtained from a laser scanner which captures data at up to 125,000 points per second.

In conventional methods, for example in software provided to DeltaSphere customers for some time, a user may typically select points of interest within a display representing the 3D data set and interactively make measurements, such as measuring distance from one point to another, or perpendicular distance from one surface to another, or area of a surface, or volume bounded by a set of surfaces. The measurement line or other representation of the measurement may then be displayed within that image using well-known computer graphics techniques. In conventional methods, a single 2D or 3D display representing many thousands or millions of data points may create a very complicated and often confusing display to a user. This may make it difficult for the user to identify and specify the correct features of interest for measurement.

In addition, not all types of features are apparent in any given display format. For example, a reflectance image obtained using an infrared 3D laser rangefinder may not show some printed patterns that appear in visible light only. It would be advantageous to have additional methods for making and displaying measurements in ways that a user might find more natural or easier to understand. As such, user productivity would be increased, and new applications for 3D range finder technology could be enabled.

SUMMARY OF THE INVENTION

The present invention and its various embodiments seek to address at least some of the above needs and problems while attempting to deliver one or more of the above advantages. The present invention provides a number of embodiments that seek to allow a user to more effectively specify and display measurements within a 3D range data set. As such, the user can more productively interact with 3D range data sets to allow applications to be better served. The present invention provides methods, computer program products, and apparatuses for specifying and displaying measurements within a 3D range data set.

In a first embodiment, the present invention provides a method for making measurements within a 3D range data set obtained using a 3D rangefinder device. The method includes the step of providing a 3D range data set. The 3D range data set can be represented as a first 2D displayed image. Further, the 3D range data set may be represented as a second displayed image selected from the group consisting of a second 2D displayed image and a 3D displayed image. Next, at least a first feature within the first 2D displayed image and at least a second feature within the second displayed image are identified. A measurement utilizing the 3D range data set and based on at least the first feature and the second feature is computed. The computed measurement may be displayed within at least one of the first 2D displayed image and the second displayed image. Various other embodiments related to the above are provided.

A second embodiment of the invention provides a computer program product stored in computer readable media for execution in at least one processor. The computer program product is useful for making measurements within a 3D range data set obtained using a 3D rangefinder device. The computer program product comprises a number of software modules therein. A first software module for providing a first 3D range data set to the at least one processor is included. Further, a second software module is provided for representing the 3D range data set as a first 2D displayed image. A third software module is included for representing the 3D range data set as a second displayed image selected from the group consisting of a second 2D displayed image and a 3D displayed image. In addition, a fourth software module for identifying at least a first feature within the first 2D displayed image is provided. A fifth software module for identifying at least a second feature within the second displayed image is included in the embodiment. Also, a sixth software module for computing a measurement utilizing the 3D range data set and based on at least the first feature and the second feature is provided. A seventh software module is included for displaying the computed measurement within at least one of the first 2D displayed image and the second displayed image. The present invention also provides other embodiments related to the preceding embodiments.

The present invention provides an apparatus in a third embodiment. The apparatus may be used for making measurements within a 3D range data set obtained using a 3D rangefinder device. At least one computer processor executing a computer program product within is provided by the apparatus. A number of software modules are included within the computer program product. Thus, a first software module for providing a first 3D range data set to the at least one processor is provided. A second software module is included for representing the 3D range data set as a first 2D displayed image. Further, the embodiment provides a third software module for representing the 3D range data set as a second displayed image selected from the group consisting of a second 2D displayed image and a 3D displayed image. A fourth software module for identifying at least a first feature within the first 2D displayed image is included. In addition, a fifth software module is provided for identifying at least a second feature within the second displayed image. A sixth software module for computing a measurement utilizing the 3D range data set and based on at least the first feature and the second feature is provided. Also, a seventh software module is included for displaying the computed measurement within at least one of the first 2D displayed image and the second displayed image. Other embodiments related to the preceding are provided.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
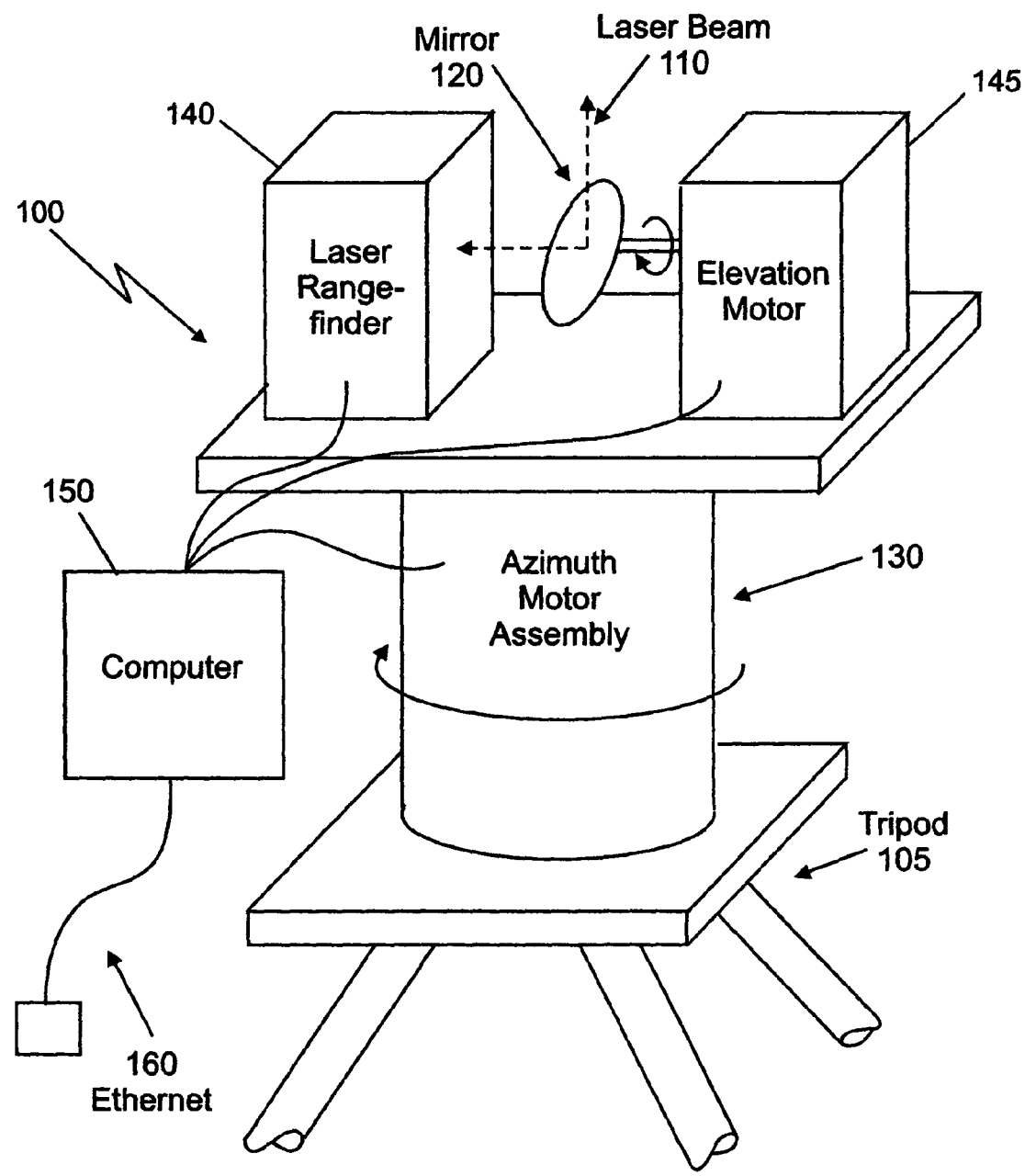
FIG. 1 is a diagram illustrating a conventional 3D scanning laser rangefinder.

The present invention now will be described more fully hereinafter with reference to the accompanying illustrative figures, in which various embodiments of the invention are shown. This invention may, however, be embodied in many different forms and should not be construed as limited to the embodiments set forth herein. Rather, these embodiments are provided so that this disclosure of the present invention will be thorough and complete, and will fully teach and describe the invention to those skilled in the art. Although specific terms are employed herein, they are used in a generic and descriptive sense only and not for purposes of limiting the scope of the present invention as defined by the attached claims in any way. Some terminology may be defined herein and used to describe forthcoming embodiments of the present invention, in order to teach the present invention to those skilled in the art. Terms not described explicitly in this disclosure should be construed as they would by those skilled in the art. Unless otherwise expressly limited, all terms used herein including technical and scientific terms, whether defined herein or not, are intended to have the broadest possible meaning as understood by one of ordinary skill in the art. It will be further understood that terms not explicitly defined herein should be interpreted as having the broadest possible meaning or meanings found in commonly used dictionaries, consistent with their meaning in the context of the relevant art. Some terms will be explicitly defined herein and used to describe embodiments of the present invention to those skilled in the art. Terms defined explicitly herein should be interpreted as the broader of their definition herein and their dictionary meanings. These defined terms should accordingly be construed according to their broadest possible meaning to skilled artisans in this field.

The Figures are provided for illustrative purposes for teaching purposes and to assist in understanding the present invention, and should not be viewed as precision blueprints or perfectly scaled drawings. In the drawings provided, the dimensions of features or regions may be exaggerated for clarity, readability, or the like. Features in the Figures may not be exactly to scale. The Figures are provided to show example embodiments of the present invention. Thus, embodiments of the present invention should not be construed as limited solely to the particular Figure or Figures illustrated herein but may include variations and deviations from many sources. Like numbers refer to like features or elements throughout. As used herein the term "and/or" includes any and all combinations of one or more of the associated listed items. Further, as used herein the term "at least" includes the number specified plus more than the number specified, unless explicitly limited otherwise.

As used herein, the singular forms "a", "an" and "the" are intended to include the plural forms as well, unless the context clearly indicates otherwise. It will be further understood that the terms "comprises" or "comprising," when used in this specification, specify the presence of stated features, steps, operations, elements, and/or components, but do not preclude the presence of one or more additional features, steps, operations, elements, components, and/or combinations thereof. Moreover, terms such as "horizontal", "vertical" and "perpendicular" indicate general directions or relationships rather than precise 0° or 90° orientations. Ranges and angles are approximate and are provided merely to teach the invention.

In one embodiment, the present invention provides a method for making measurements within a 3D range data set obtained using a 3D rangefinder device. The method includes the step of providing a 3D range data set. The 3D range data set can be represented as a first 2D displayed image. Further, the 3D range data set may be represented as a second displayed image selected from the group consisting of a second 2D displayed image and a 3D displayed image. Next, at least a first feature within the first 2D displayed image and at least a second feature within the second displayed image are identified. A measurement utilizing the 3D range data set and based on at least the first feature and the second feature is computed. The computed measurement may be displayed within at least one of the first 2D displayed image and the second displayed image. Various other embodiments related to the above are provided.

In embodiments of the method, the computed measurement may be displayed in various ways. For example, the computed measurement can be displayed in at least one of the first 2D displayed image only, the second displayed image only, or in both the first 2D displayed image and the second displayed image in combination. Further, the display of the computed measurement might comprise various displays. For instance, a measurement point, a plurality of measurement points, a measurement line, a plurality of measurement lines, a measurement surface, a plurality of measurement surfaces, or a measurement volume could be displayed. Further, values, a plurality of values, a plurality of measurement volumes, a measurement feature, a plurality of measurement features, and combinations thereof could also be displays of the computed measurement. The computed measurement could be displayed in at least a third displayed image, in the first 2D displayed image, in the second displayed image, or in some combination of the preceding display images.

Many 3D rangefinder devices may be used to provide the 3D range data sets used in numerous embodiments. A scanning laser rangefinder using time of flight range measurement principles, a scanning laser range finder using phase comparison range measurement principles, or a scanning laser rangefinder using any other range measurement principles can be used. Further, an imaging laser rangefinder range camera using time of flight range measurement principles, an imaging laser rangefinder range camera using phase comparison range measurement principles, or an imaging laser rangefinder range camera using any other range measurement principles are also possible to use. A triangulation rangefinder, a stereo image rangefinder, a multiple image rangefinder, or any other device that acquires a multiplicity of range data points simultaneously could be used to provide 3D data sets. Also, any other device that acquires a multiplicity of range data points over a period of time can be used, as well as combinations of the above.

A number of method embodiments require 2D displayed images, such as the first and second 2D displayed images. Each 2D displayed image could comprise a variety of 2D images. For instance, a 2D displayed image could be a 2D range image comprising range values from the 3D rangefinder device converted to monochrome, a 2D range image comprising range values from the 3D rangefinder device converted to false color, or a 2D reflectance image comprising intensity values of the rangefinding signal reflected from a physical surface and thereafter received by the 3D rangefinder device converted to monochrome. Also, a 2D reflectance image comprising intensity values of the rangefinding signal reflected from a physical surface and thereafter received by the 3D rangefinder device converted to false color, a 2D registered color image comprising a color camera image previously registered with 3D range data, or a 2D registered color image wherein the image is acquired from the same perspective as the 3D range data set could be used. Further, a 2D image might be a 2D registered color image wherein the image is acquired from a different perspective than the 3D range data set, a 2D registered color image wherein the image is acquired with the same resolution as the 3D range data set, a 2D registered color image wherein the image is acquired with different resolution from the 3D range data set, a 2D image displayed in spherical projection format, a 2D image displayed in any other 3D-to-2D projection format, or a 2D registered monochrome image comprising a monochrome camera image previously registered with 3D range data.

In some embodiments of the method, the second display image can comprise a 3D image or various types. For instance, a 3D image could be a 3D point display, a 3D point display in orthogonal projection, or a 3D point display in perspective projection. The 3D image could be a 3D polygonal mesh, a 3D polygonal mesh in orthogonal projection, or a 3D polygonal mesh in perspective projection. Further, a 3D surface geometry display, a 3D surface geometry display in orthogonal projection, or a 3D surface geometry display in perspective projection could be the 3D image used in embodiments.

Those skilled in the art will appreciate that the method embodiments can be implemented in any number of ways. The method could be implemented in a computer processor executing a suitable computer software program product therein. Further, the method may be implemented in a suitable computer software program product embodied on computer readable tangible media.

Identifying the first feature, the second feature, or both, could be done in a number of ways. For instance, this may be done manually by a user, automatically using software, or by both in combination. Further, identifying could consist of using a computer cursor controlled by a mouse to identify, using a computer cursor controlled by a pointing stick to identify, using a computer cursor controlled by a joystick to identify, using a computer cursor controlled by a touch pad to identify, using software to identify, or using combinations of the above to identify. In addition, identifying could include automatically orienting a measurement perpendicularly from a specified surface, automatically placing a feature restricted to a specified surface, automatically placing a feature in the center of a circular feature, or the like, or automatically using combinations of the preceding to identify.

For some embodiments, specifying corresponding features could comprise any of a number of techniques used either individually or in combination. Sub-pixel interpolation in any 2D displayed image may be used, wherein a software tool may allow the user to estimate and specify the location of a feature anywhere within a pixel and not just at its origin. Further, interpolation may be used between measured 3D range data points on surfaces in any 3D displayed image wherein a software tool may allow the user to estimate and specify the location of a feature anywhere upon a surface even if that particular location is not directly associated with a measured 3D range data point. In addition, estimates of the centers of features may be used, wherein the user may estimate and specify the location of the center of a feature even if the particular pixel at that chosen center appears no different from adjacent pixels. Holes and data interpolated across holes could be used wherein the rangefinder device did not acquire a range measurement. A software tool may allow the user to estimate and specify the location of a feature anywhere within a hole even though that particular location is not directly associated with a measured 3D range data point.

Another embodiment of the invention provides a computer program product stored in computer readable media for execution in at least one processor. The computer program product is useful for making measurements within a 3D range data set obtained using a 3D rangefinder device. The computer program product comprises a number of software modules therein. A first software module for providing a first 3D range data set to the at least one processor is included. Further, a second software module is provided for representing the 3D range data set as a first 2D displayed image. A third software module is included for representing the 3D range data set as a second displayed image selected from the group consisting of a second 2D displayed image and a 3D displayed image. In addition, a fourth software module for identifying at least a first feature within the first 2D displayed image is provided. A fifth software module for identifying at least a second feature within the second displayed image is included in the embodiment. Also, a sixth software module for computing a measurement utilizing the 3D range data set and based on at least the first feature and the second feature is provided. A seventh software module is included for displaying the computed measurement within at least one of the first 2D displayed image and the second displayed image. The present invention also provides other embodiments related to the preceding embodiments. Further, the prior discussion related to the method embodiments applies also to the computer program product embodiments.

The present invention provides an apparatus in yet another embodiment. The apparatus may be used for making measurements within a 3D range data set obtained using a 3D rangefinder device. At least one computer processor executing a computer program product within is provided by the apparatus. A number of software modules are included within the computer program product. Thus, a first software module for providing a first 3D range data set to the at least one processor is provided. A second software module is included for representing the 3D range data set as a first 2D displayed image. Further, the embodiment provides a third software module for representing the 3D range data set as a second displayed image selected from the group consisting of a second 2D displayed image and a 3D displayed image. A fourth software module for identifying at least a first feature within the first 2D displayed image is included. In addition, a fifth software module is provided for identifying at least a second feature within the second displayed image. A sixth software module for computing a measurement utilizing the 3D range data set and based on at least the first feature and the second feature is provided. Also, a seventh software module is included for displaying the computed measurement within at least one of the first 2D displayed image and the second displayed image. Other embodiments related to the preceding are provided. Further, the prior discussion related to the method embodiments applies also to the apparatus embodiments. Next we discuss more details regarding various embodiments of the present invention.

Figure 4:
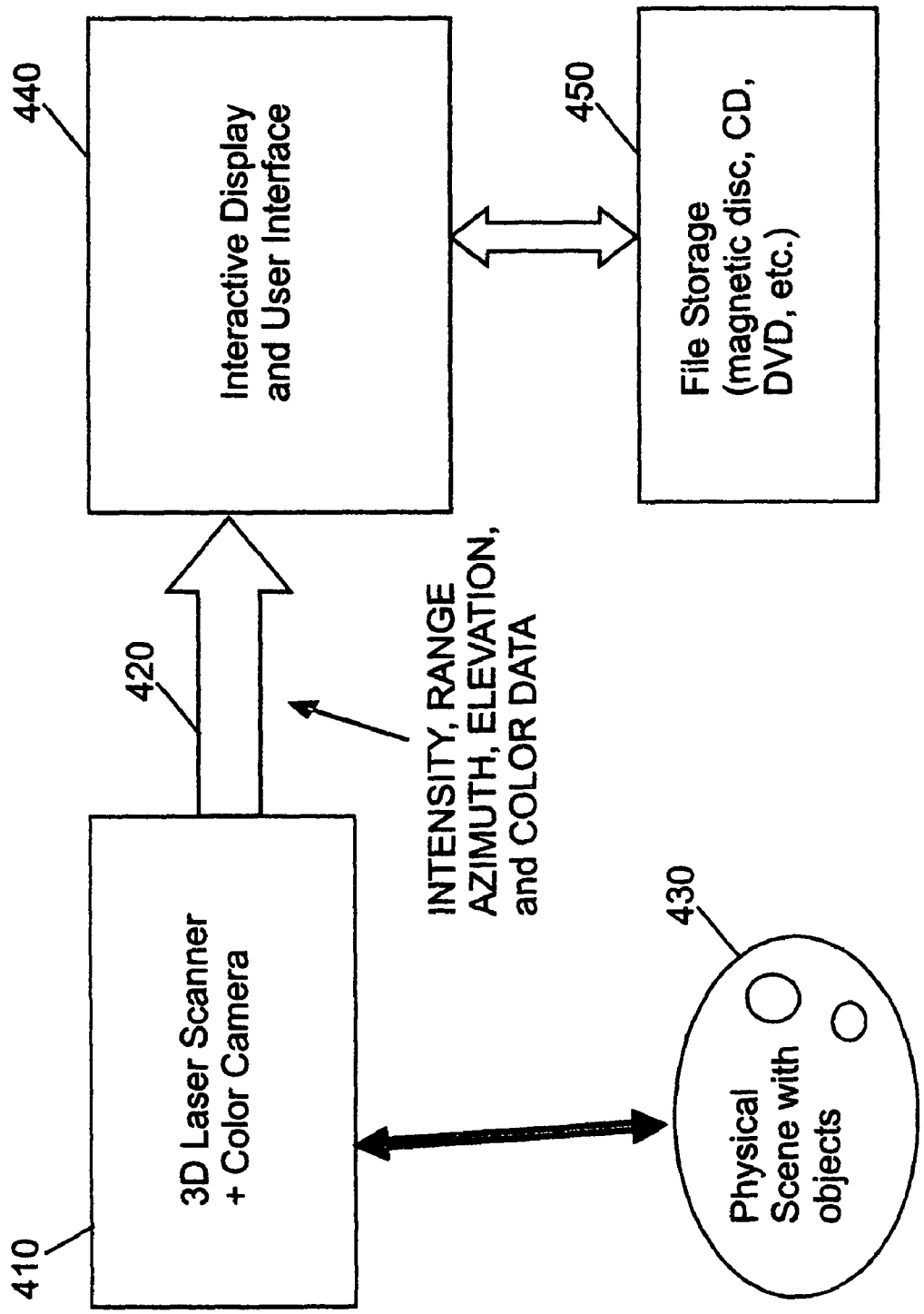
FIG. 4 is a diagram illustrating one example of the acquisition of a 3D range data set.

Referring to FIG. 4, a 3D rangefinder 410 is used to acquire a 3D range data set 420 from a physical object or scene 430. One 3D rangefinder 410 embodiment shown in FIG. 1 is a laser scanning 3D rangefinder 100 comprising a time-of-flight laser rangefinder 140, elevation scanning mirror 120 which is rotated by elevation motor 145, and azimuth rotating motor assembly 130. The 3D rangefinder such as shown in FIG. 1 also includes an embedded computer 150 for interfacing to and controlling the rangefinder 140, elevation motor 145, and azimuth motor 130. The embedded computer 150 communicates with any external computer via Ethernet 160 and also transfers data samples from the rangefinder, performs necessary data processing such as applying calibration tables, and passes data samples to the external computer for visualization, storage, and subsequent processing.

We see that in FIG. 4, the 3D range data set 420 for each data sample comprising intensity, range, azimuth, and elevation values is transferred to an external computer and presented in a computer display 440 for evaluation and control of laser scanning parameters such as resolution and speed. The data is simultaneously stored in a computer file 450 for later processing and display.

Figure 5:
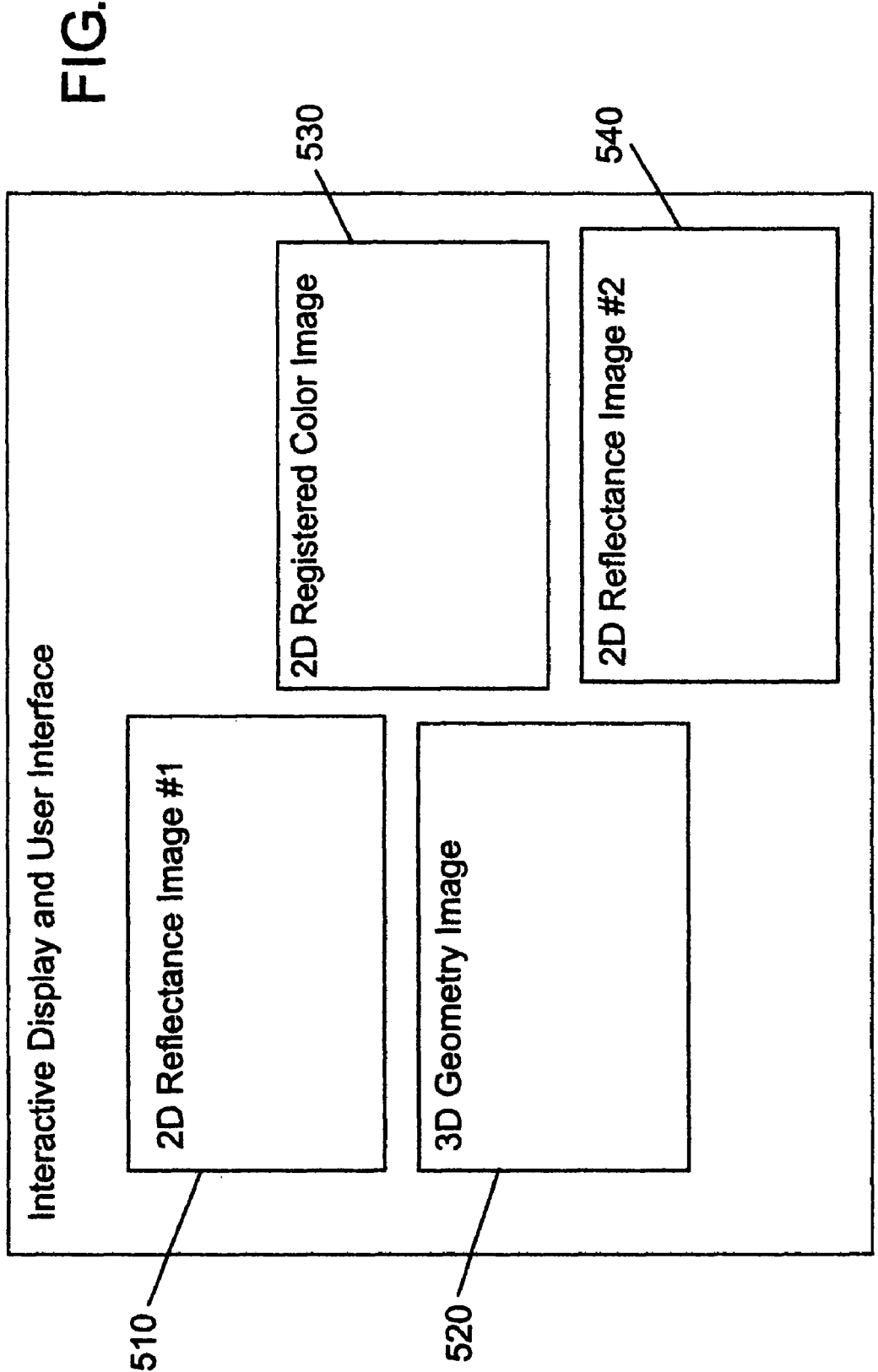
FIG. 5 is a diagram illustrating an example display of multiple images representing a single 3D range data set, according to some embodiments of the present invention.

First a 3D data set to be used for measurement is presented to a user via a computer display. The user may select from multiple formats which may be used for displaying this data as shown in FIG. 5. As an example, data from a 3D data set is represented in windows 510, representing a 2D Reflectance Image for example, and 520, representing a 3D geometric image on the display screen while data from the same 3D data set is represented in windows 530 and 540 on the display screen. Window 540 may represent 2D Reflectance Image #2 having a different false color assignment from the image in 510, and window 530 can represent a 2D Registered Color Image, for example.

A 3D displayed image format such as 520 is one in which the user may select a particular 3D viewpoint and then view the 3D range data as geometric figures in perspective projection or in orthogonal projection or via some other projection. Techniques for displaying collections of 3D data are well known from computer graphics textbooks such as "Computer Graphics: Principles and Practice in C" by James D. Foley, Andries van Dam, Steven K. Feiner, and John F. Hughes (Addison Wesley 1995). The display may represent range data samples as 3D points (also known as a point cloud) which may all be colored a single color, which may have false color assigned to each point based on its range, which may have color assigned to each point based on the intensity of the reflected laser beam, or colored via any other scheme. In another 3D display technique, the 3D range data points may be linked together into a displayed mesh using well known computer graphics techniques, such that neighboring points are connected via lines within the display. The lines of the mesh may be colored using any of the techniques discussed above using well-known computer graphics techniques. In another 3D display technique, the 3D range data points may be linked together into a surface using well known computer graphics techniques. The surface may have range values interpolated between actual data points using linear, quadratic, cubic, or any well-known surface interpolation technique. The color of the surface at each displayed pixel may be determined in any of a number of well-known ways, including computing simulated lighting effects based on the orientation of the interpolated surface, interpolating reflectance intensity values measured at each data point, mapping a 2D image or any other function to the 3D surface using well-known texture-mapping techniques, combinations thereof, or any using other well-known techniques for surface rendering.

Figure 2:
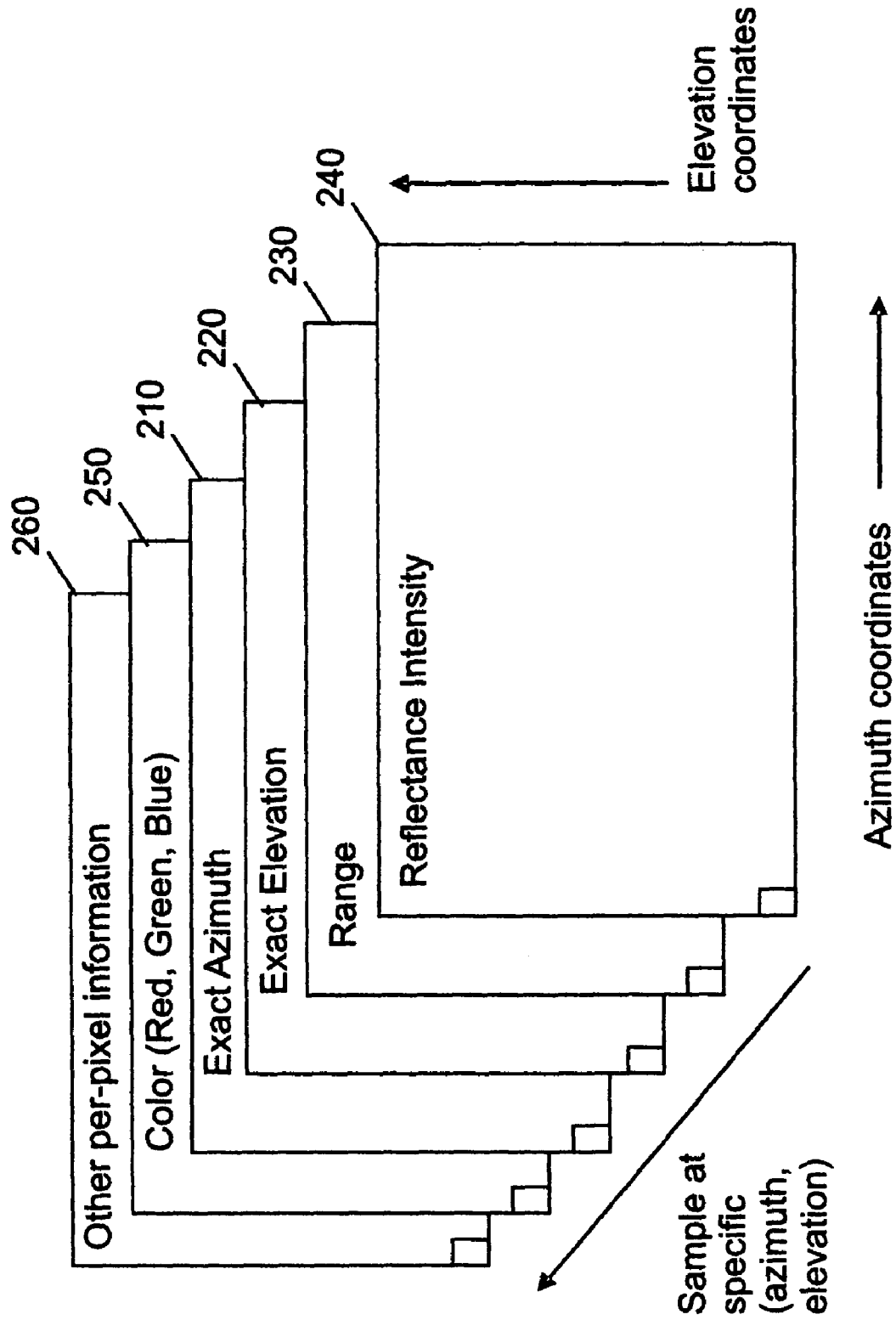
FIG. 2 is a diagram illustrating multiple example values that could be associated with a pixel within a 2D image representing a 3D range data set.
Figure 3:
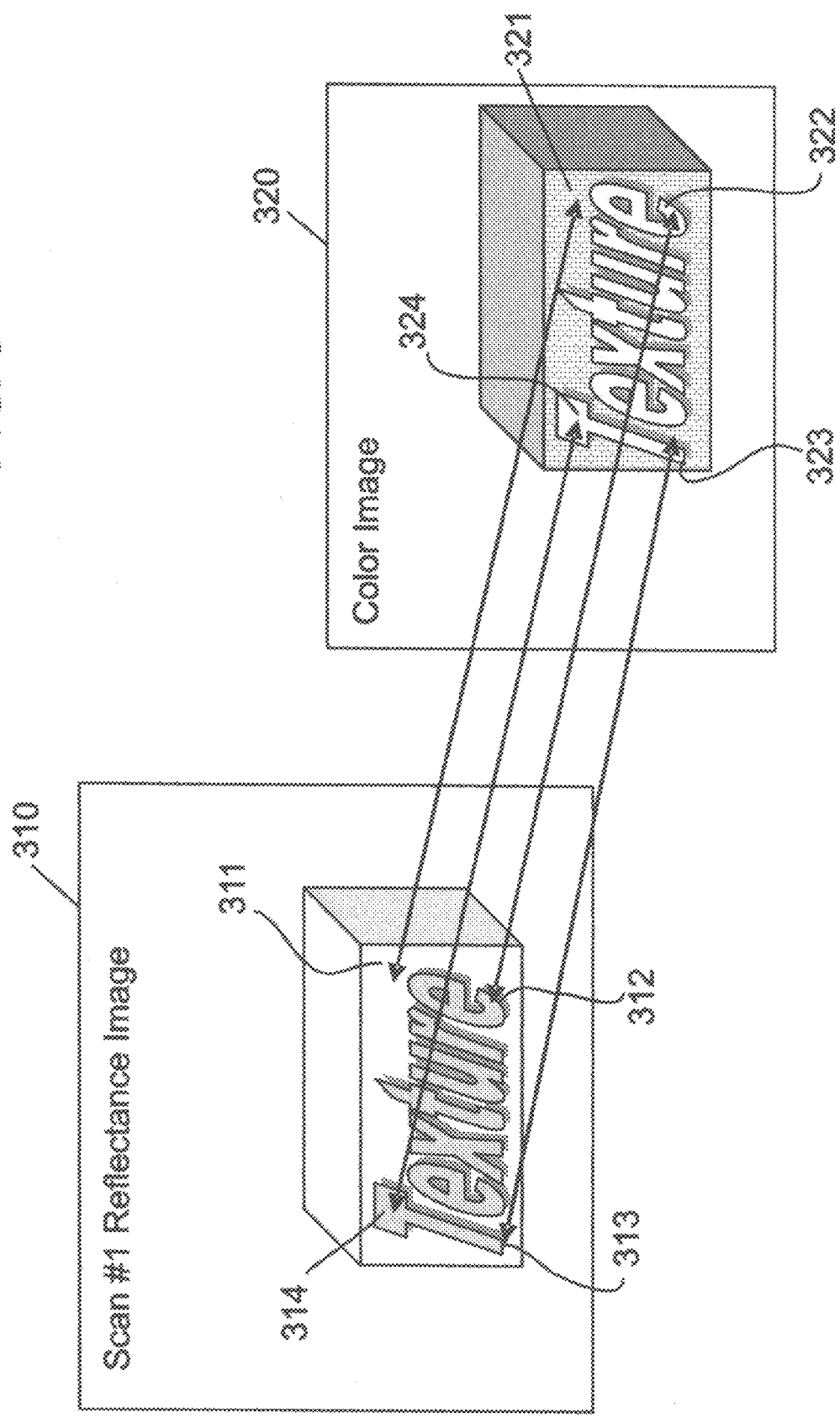
FIG. 3 is a diagram illustrating corresponding range and color information for a registered color image representing a 3D range data set.

A 2D displayed image format such as 510, 530, or 540 is one in which the 3D data set is represented as a 2D image. There are many well-known techniques for doing this since the data from a typical 3D rangefinder is obtained by scanning in two dimensions, typically azimuth and elevation. The resulting data can naturally be represented as a 2D image in spherical projection, where the azimuth angle of a 3D sample is represented as the horizontal or X axis and the elevation angle is represented as the vertical or Y axis on the display, and each pixel represents one or more 3D data points depending on the scale chosen. The 2D displayed image need not be represented in spherical projection, but in any other well-known projection of a 3D data set to a 2D display. As illustrated in FIG. 2, each pixel may have a multiplicity of associated values stored with it, including precise azimuth angle value 210, precise elevation angle value 220, range value 230, reflectance value 240, color 250 (RGB), and any other useful values 260. The color of each pixel within the 2D displayed image may be determined in any of a number of well-known formats. A Range Image has a false color assigned to each pixel based on its range. A Reflectance Image such as 510 or 540 has a color assigned to each pixel based on the intensity of the reflected laser beam. A Registered Color Image such as 530 has a color assigned to each pixel based on the color obtained from a color sensor such as a 2D digital camera such that the range data and color data are aligned as shown in FIG. 3.

One aspect of embodiments of the present invention consists of first selecting a measurement feature in a display window that contains an image representing the 3-D range data set in one format and then selecting another measurement point in another display window that contains an image representing the 3-D range data set in a different format. For example, one endpoint of a length measurement may be specified in a 2D reflectance image representing 3D range data and the other endpoint of the length measurement may be selected within a 3D texture-mapped surface display of the same 3D range data set.

It will be appreciated that multiple measurement features may be specified within 2 or more display windows and formats. It will also be appreciated that many kinds of measurements may be undertaken using this new technique, such as measuring distance, area, volume, diameter, etc., as well as fitting mathematical surfaces or structures such as planes, cylinders, or curved surfaces. Measurements of and between various points, surfaces, and structures may be easily made using known calculation techniques.

The user specifies measurement features in images by identifying a particular pixel within a 2D or 3D displayed image which will allow the calculation of the X, Y, and Z coordinates of the data represented by that pixel. For example, the user might use a mouse or other control device to position a cursor such as a crosshairs over a desired pixel within a 2D reflectance image. Since the azimuth 210, elevation 220, and range 230 values for a 3D range sample are associated with the pixel, simple trigonometry can be used to convert from spherical to Cartesian coordinates and obtain the corresponding X, Y, and Z values. In an additional feature specification technique, the image might be zoomed in so that an image data pixel covers a 10×10 array of pixels on the screen. In that case, the cursor could be used to indicate a sub-pixel location to within 0.1 pixel and more accurate X, Y, and Z values can be readily interpolated based on the sub-pixel location and azimuth, elevation, and range values associated with neighboring pixels. In a related additional feature specification technique a point on a 3D surface might be selected with a cursor and then the X, Y, and Z values may be calculated by interpolating between the actual 3D range data points that define the surface. In another feature specification technique, the method can be extended to cover holes and data interpolated across holes. Holes are places where the 3D rangefinder did not acquire a range measurement because of insufficient returned laser energy or other reasons. An interactive or automated software tool may allow the user to estimate and specify the location of a feature point anywhere within a hole even though that particular location is not directly associated with a measured 3D range data point. For example the user may interactively or automatically estimate and specify the location of the center of a circular hole in a 2D or 3D displayed image. Calculation of the bi-linear, bi-cubic, or other interpolation of surrounding measured range data points can then yield the estimated feature point location.

In addition, part or all of a measurement's position or orientation may be automatically or semi-automatically provided. For example, software may automatically ensure that a measurement line's orientation is always perpendicular to a specified surface. Additionally the user may specify all or part of the measurement information numerically via a keyboard or imported from a data file.

Another aspect of embodiments of the present invention covers new methods for displaying measurement information in multiple windows and multiple formats. In the new method, a measurement is displayed in two or more images that show 3D range data in different formats. For example, a length measurement line may appear in one window representing the 3D data set as a 3D point cloud and simultaneously in another window representing the same 3D data set as a 2D reflectance image. There may be multiple display formats with the measurement displayed appropriately in all the display formats. If one display window does not include the entire measurement, then only part of the measurement (such as an end point) may be displayed.

In addition to measurement points, a user may create an interactive landmark point or area that can then be selected to display additional information such as text, links to images or other files, links to web sites, etc. The ability to place landmarks in one display format and have them also be displayed in 2D or 3D as appropriate within other display formats is highly desirable.

Figure 6:
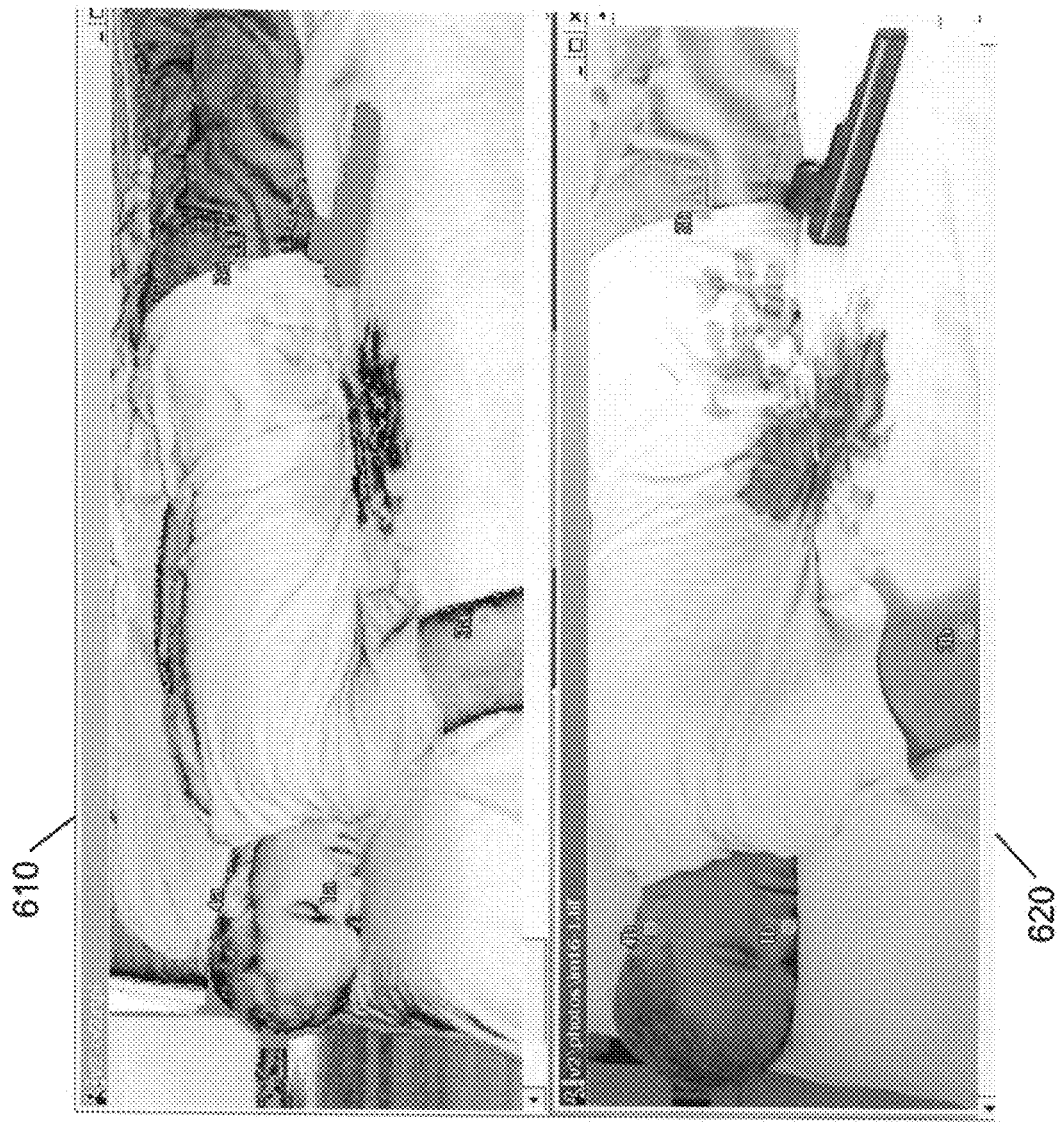
FIG. 6 is a diagram illustrating a reflectance image representing a 3D data set in one window and a 2D color image taken from the same perspective in another window, according to some embodiments of the present invention.

FIG. 6 illustrates two conventional image formats used in representing a 3D range data set of a simulated murder scene acquired by a 3D rangefinder. The top window 610 is a reflectance image and the bottom window 620 is a 2D color image. Corresponding points in the two image windows have been selected so that a registered color image can be created as discussed above. These conventional methods of 3D data representation have been available to DeltaSphere customers since some time ago, for example.

Figure 7:
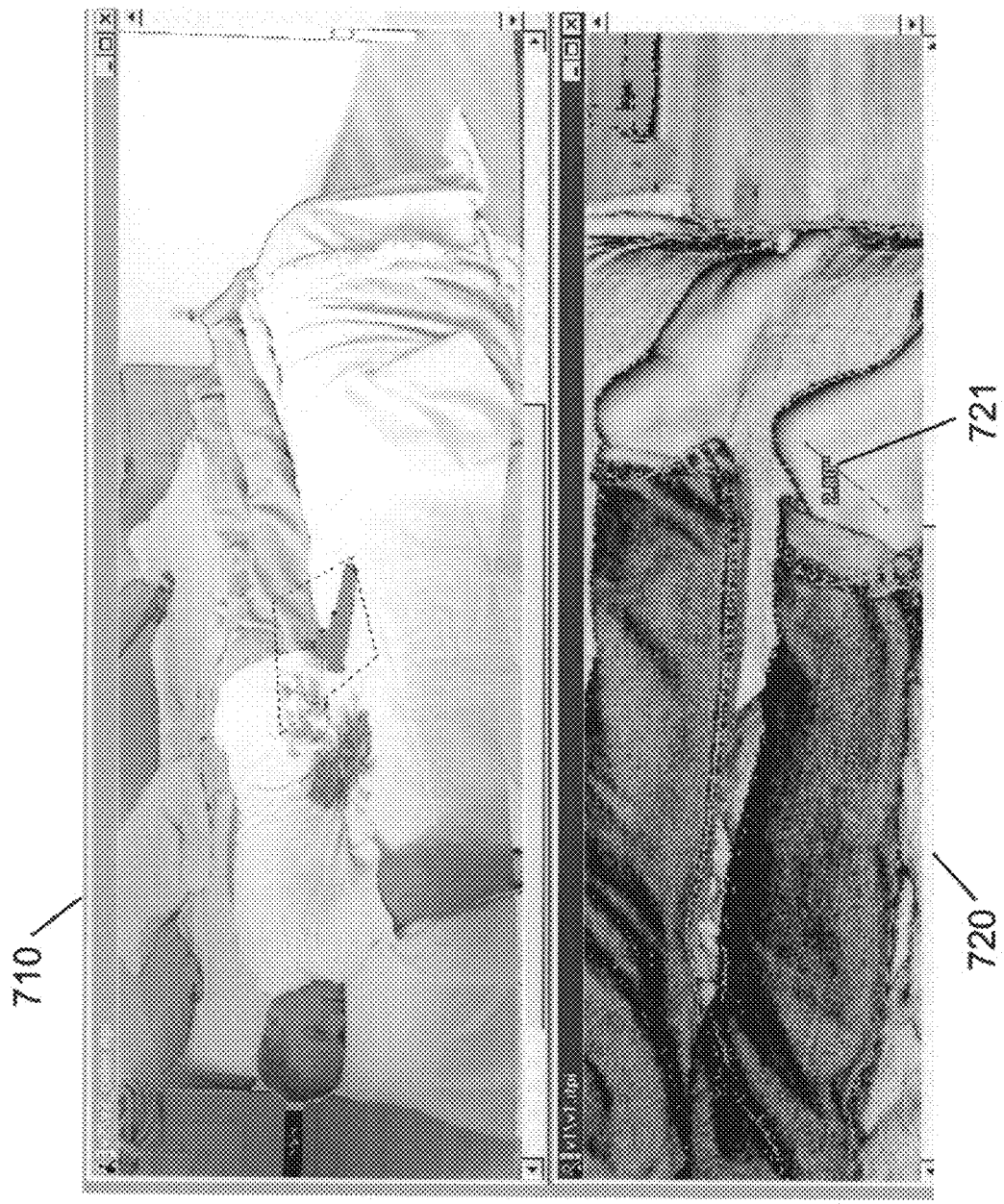
FIG. 7 is a diagram illustrating a registered color image representing one 3D data set and a reflectance image representing another 3-D data set showing a measurement between two points within a single 3d data set and image thereof, according to some embodiments of the present invention.

FIG. 7 illustrates conventional image formats used in representing two 3D range data sets of a simulated murder scene acquired by a 3D rangefinder from two different viewpoints. The top window 710 is a registered color image representing one 3D data set. The bottom window 720 is a reflectance image representing another 3D data set. Illustrated is a measurement 721 which has been made between two points on the victim's foot, both of which were selected in a single reflectance image representing a single 3D data set. This conventional method of measurement and display has been available to DeltaSphere customers for some time.

Figure 8:
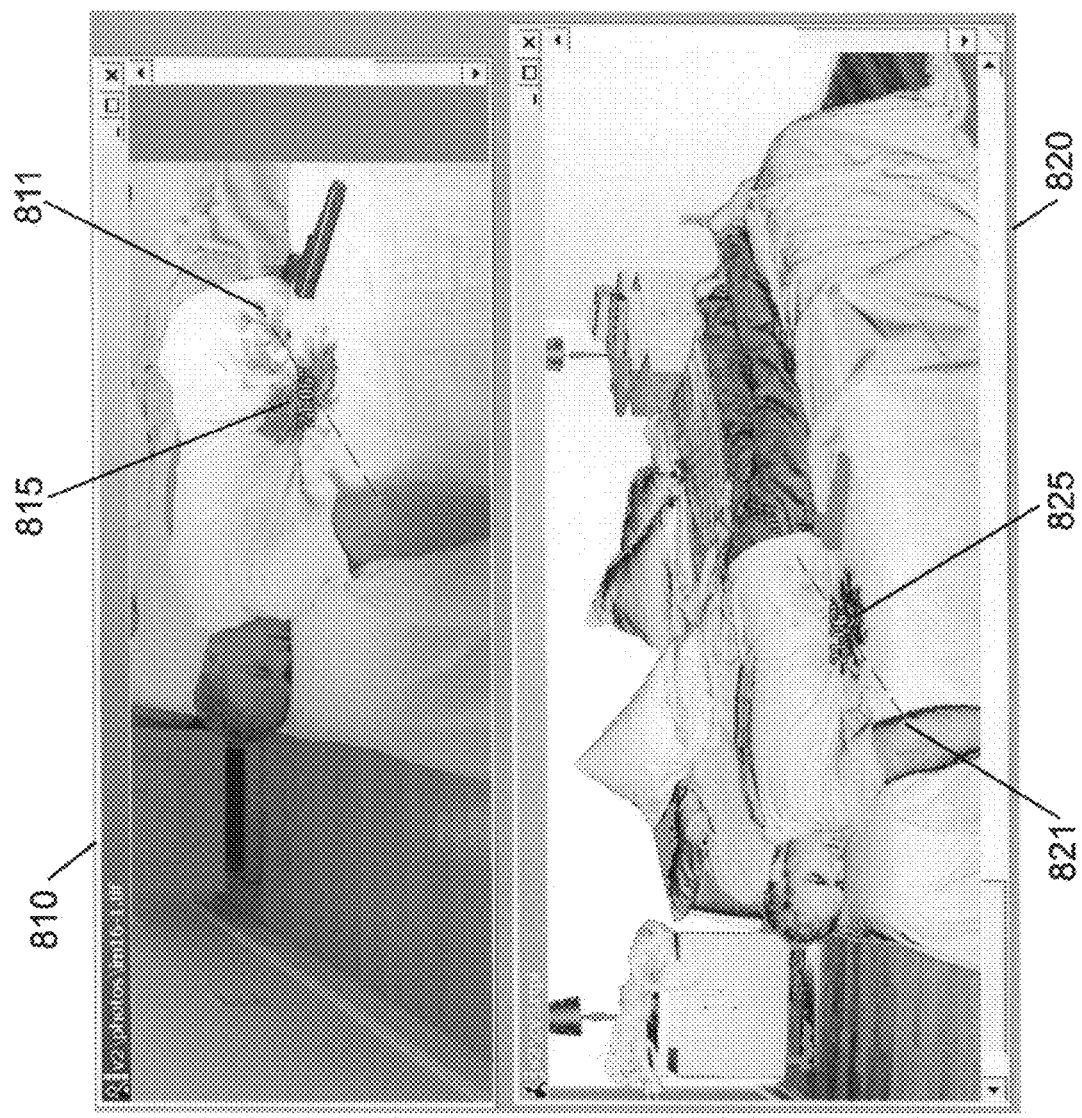
FIG. 8 is a diagram illustrating a registered color image and a reflectance image representing the same 3D data set showing measurement between two points and images thereof, according to some embodiments of the present invention

FIG. 8 illustrates aspects of embodiments of the present invention. The top window 810 is a registered color image representing a 3D range data set of a simulated murder scene acquired by a 3D rangefinder. The bottom window 820 is a reflectance image representing the same 3D range data. Illustrated is the technique of measurement between two points located in the two different images. The point on the elbow 821 was selected in the reflectance image 820 and the point on the shirt 811 was selected in the registered color image 810 where the blood stain was more visible. Also illustrated in FIG. 8 is the technique of display of the same measurement 815 and 825 within two windows 810 and 820 respectively and displayed as two different image display formats.

Figure 9:
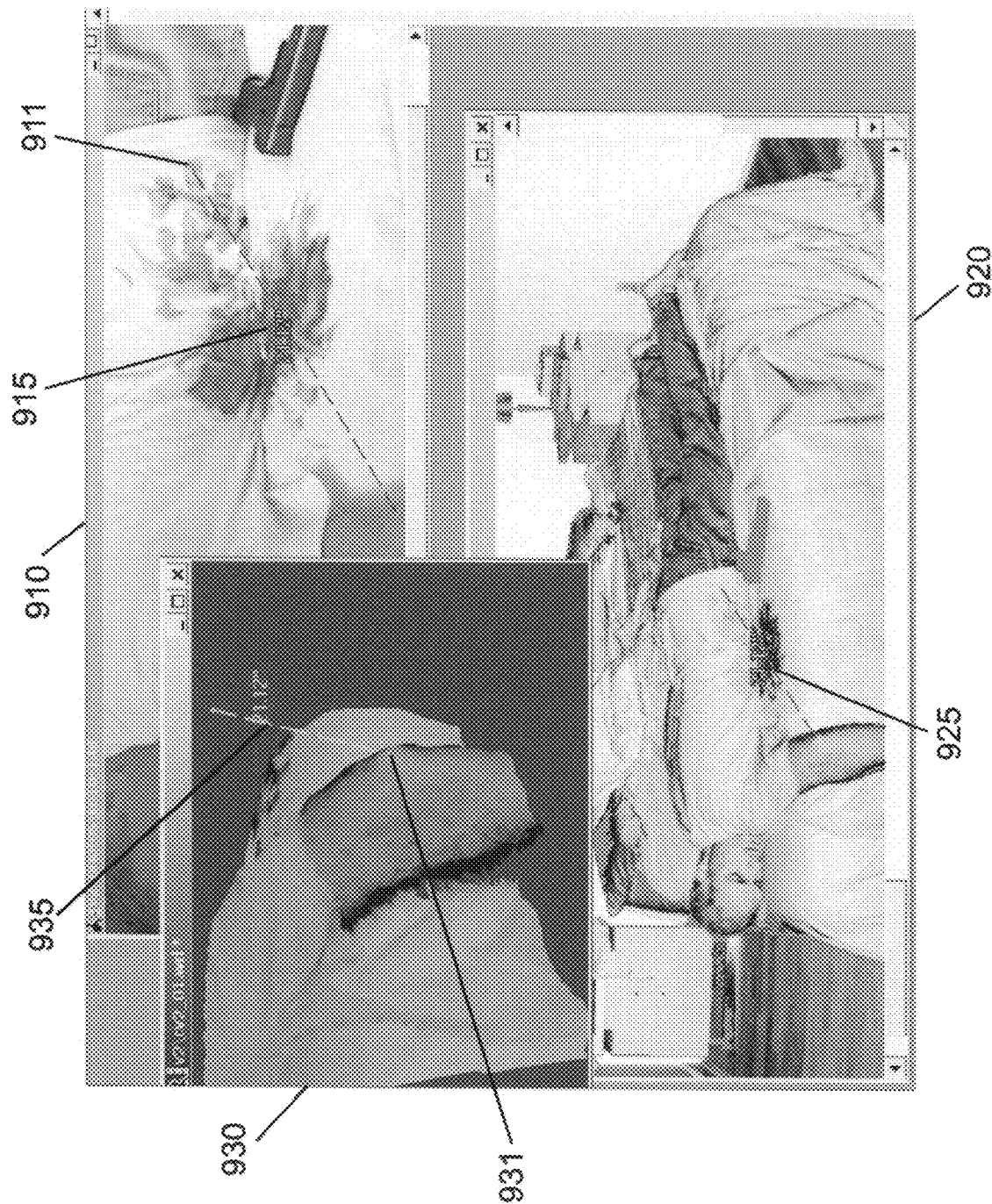
FIG. 9 is a diagram illustrating a registered color image, a reflectance image, and a 3D surface display representing the same 3D data set showing measurement between two points and images thereof, according to some embodiments of the present invention

FIG. 9 illustrates further aspects of embodiments of the present invention. The top window 910 is a registered color image representing a 3D range data set of a simulated murder scene acquired by a 3D rangefinder. The bottom window 920 is a reflectance image representing the same 3D range data. The left window is a 3D surface display 930 representing a portion of the same 3D range data. Illustrated is the technique of measurement between two points in two different images. The point on the elbow 931 was selected in the 3D surface display 930 and the point on the shirt 911 was selected in the registered color image 910 where the blood stain was more visible. Also illustrated in FIG. 9 is the technique of display of the same measurement 915, 925, and 935 within three windows 910, 920, and 930 respectively which are displayed as three different image display formats.

Figure 10:
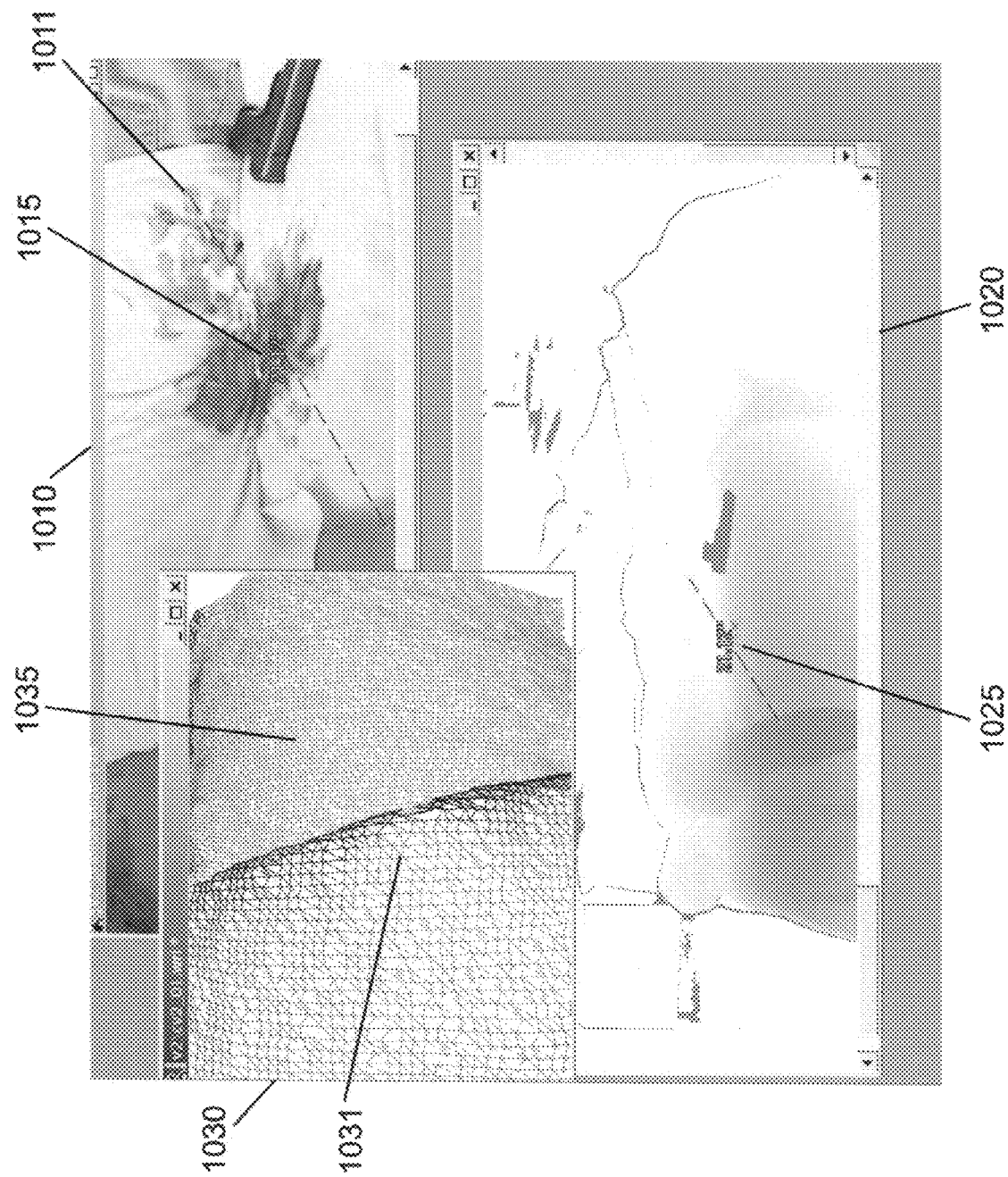
FIG. 10 is a diagram illustrating a registered color image, a range image, and a 3D mesh display representing the same 3D data set showing measurement between two points and images thereof, according to some embodiments of the present invention

FIG. 10 illustrates further aspects of embodiments of the present invention. The top window 1010 is a registered color image representing a 3D range data set of a simulated murder scene acquired by a 3D rangefinder. The bottom window 1020 is a range image representing the same 3D range data. The left window is a 3D mesh display 1030 representing a portion of the same 3D range data. Illustrated is the technique of measurement between two points in two different images. The point on the elbow 1031 was selected in the 3D mesh display 1030 and the point on the shirt 1011 was selected in the registered color image 1010 where the blood stain was more visible. Also illustrated in FIG. 10 is the technique of display of the same measurement 1015, 1025, and 1035 within three windows 1010, 1020, and 1030 respectively which are displayed as three different image display formats.

Figure 11:
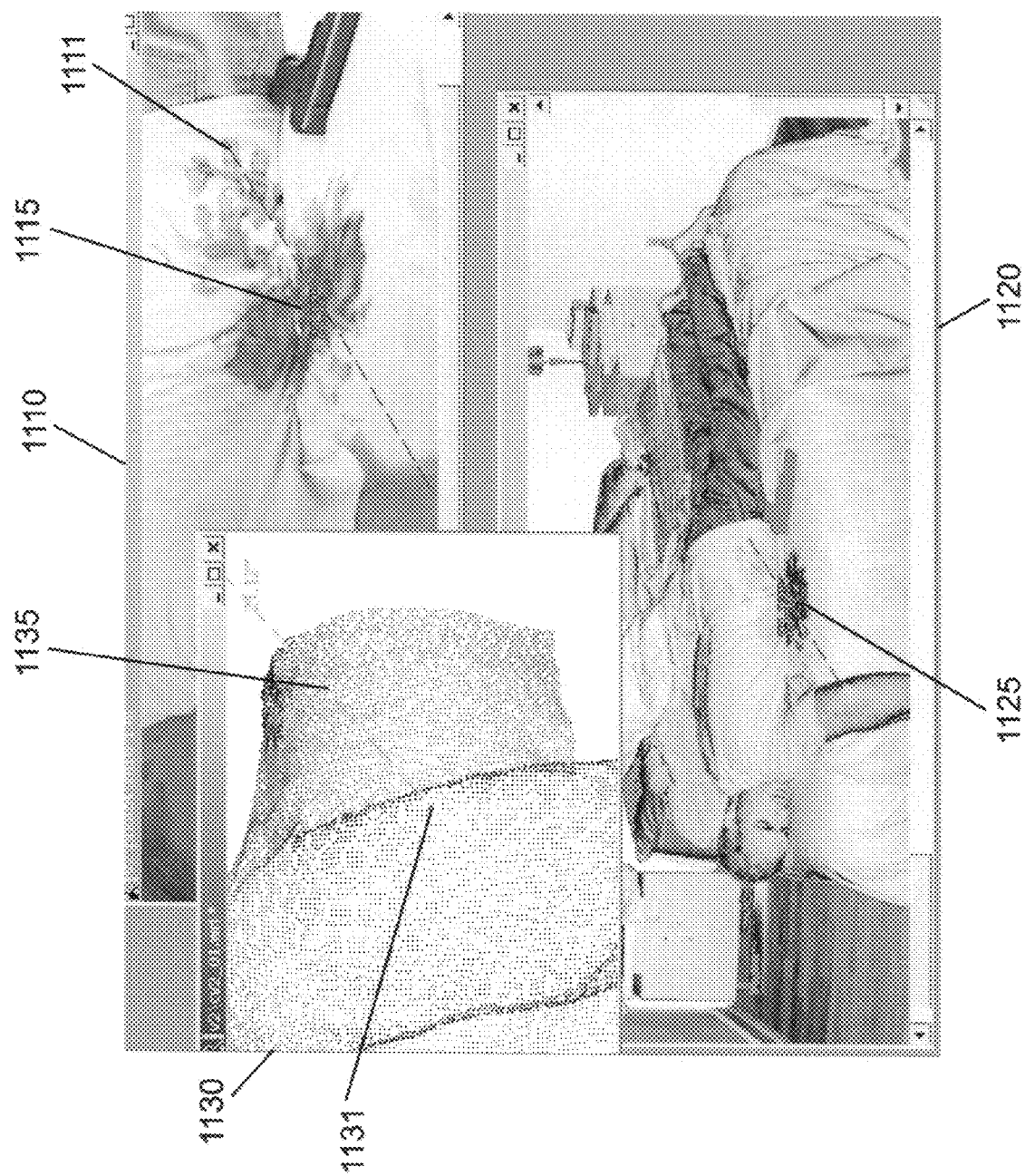
FIG. 11 is a diagram illustrating a registered color image, a reflectance image, and a 3D point cloud display representing the same 3D data set showing measurement between two points and images thereof, according to some embodiments of the present invention

FIG. 11 illustrates further aspects of embodiments of the present invention. The top window 1110 is a registered color image representing a 3D range data set of a simulated murder scene acquired by a 3D rangefinder. The bottom window 1120 is a reflectance image representing the same 3D range data. The left window is a 3D point cloud display 1130 representing a portion of the same 3D range data. Illustrated is the technique of measurement between two points in two different images. The point on the elbow 1131 was selected in the 3D point cloud display 1130 and the point on the shirt 1111 was selected in the registered color image 1110 where the blood stain was more visible. Also illustrated in FIG. 11 is the technique of display of the same measurement 1115, 1125, and 1135 within three windows 1110, 1120, and 1130 respectively which are displayed as three different image display formats.

Figure 12:
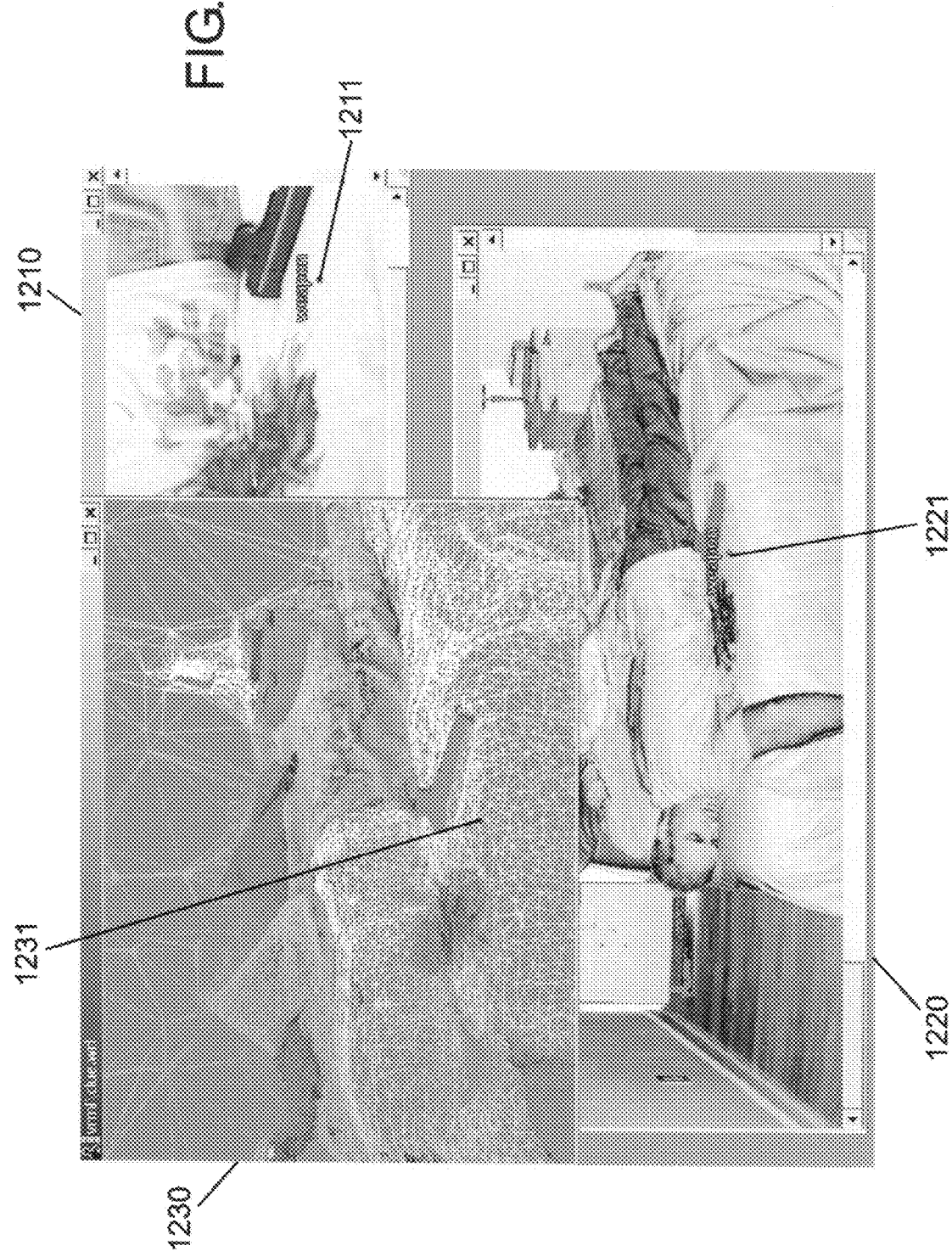
FIG. 12 is a diagram illustrating a registered color image, a reflectance image, and a 3D colored mesh display representing the same 3D data set showing specification of a landmark point and images thereof, according to some embodiments of the present invention

FIG. 12 illustrates further aspects of embodiments of the present invention. The top window 1210 is a registered color image representing a 3D range data set of a simulated murder scene acquired by a 3D rangefinder. The bottom window 1220 is a reflectance image representing the same 3D range data. The left window is a 3D colored mesh display 1230 representing the same 3D range data. The landmark point labeled "weapon" 1211 was selected in the registered color image. Illustrated is the technique of display of the same measurement point 1211, 1221, and 1231 within three windows 1210, 1220, and 1230 respectively which are displayed as three different image display formats.

Figure 13:
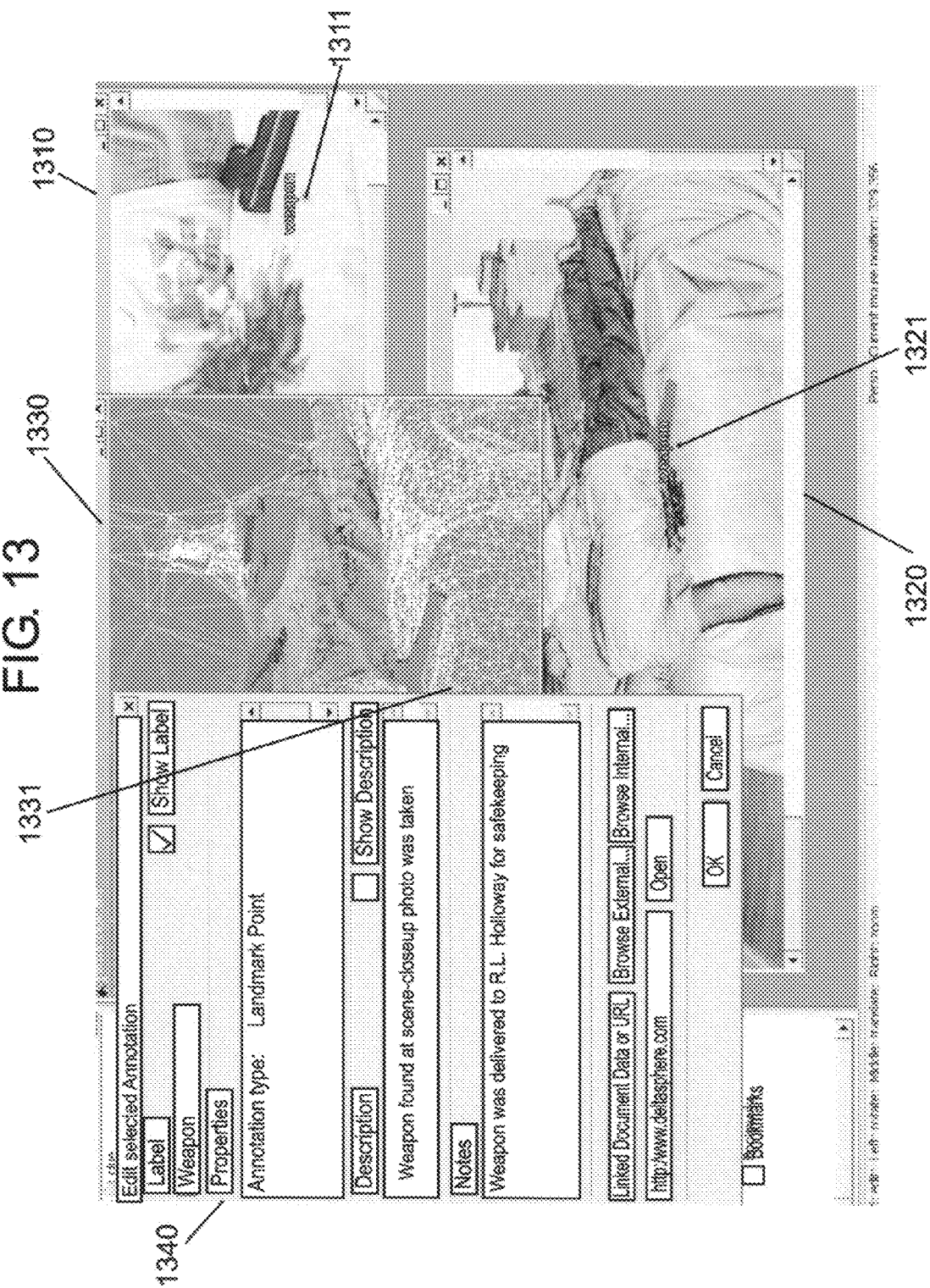
FIG. 13 is a diagram illustrating a registered color image, a reflectance image, and a 3D colored mesh display representing the same 3D data set showing specification of a landmark point, images thereof, and an associated image containing additional information, according to some embodiments of the present invention

FIG. 13 illustrates further aspects of embodiments of the present invention. The top window 1310 is a registered color image representing a 3D range data set of a simulated murder scene acquired by a 3D rangefinder. The bottom window 1320 is a reflectance image representing the same 3D range data. The middle window is a 3D colored mesh display 1330 representing the same 3D range data. The landmark point labeled "weapon" 1311 was selected in the registered color image. Illustrated is the technique of display of the same measurement 1311, 1321, and 1331 within three windows 1310, 1320, and 1330 respectively which are displayed as three different image display formats. Also illustrated is the technique of creating a pop-up window 1340 containing information and a link to additional data files and which may be accessed by selecting any measurement 1311, 1321, or 1331 within three windows 1310, 1320, and 1330 respectively which are displayed as three different image display formats.

Thus it can readily be seen that the ability to select and display measurement and other feature points within multiple display formats representing a 3D data set acquired by a 3D rangefinder provides greater ease-of-use, more flexibility, and greater utility than conventional methods limited to a single format representation for selection and display.

Many modifications and other embodiments of the invention will come to mind to one skilled in the art to which this invention pertains having the benefit of the teachings presented in the foregoing descriptions and the associated figures. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limiting the scope of the present invention in any way.

What is claimed is:

1. A method for making measurements within a 3D range data set obtained using a 3D rangefinder device, comprising:
   providing a 3D range data set obtained using a 3D rangefinder device;
   displaying the 3D range data set as a first image on a display device, wherein the first image comprises one of a 2D image that is generated from the 3D range data set or a 2D image that is registered to the 3D range data set, wherein the 2D image is registered to the 3D data set by: identifying corresponding features in the 2D image and the 3D range data set, computing the location and orientation of the device used to capture the 2D image, using the location and orientation of the device used to capture the 2D image to compute the optical path from the device used to capture the 2D image into the 3D data set, and applying the value from each pixel of the 2D image to a corresponding point or points of the 3D data set;
   displaying the 3D range data set as a second image on the display device, wherein the second image comprises one of a 3D image, a 2D image that is generated from the 3D range data set, or a 2D image that is registered to the 3D range data set;
   identifying, within the first image, at least a first feature within the 3D range data set;
   identifying, within the second image, at least a second feature within the 3D range data set, different from the first feature within the 3D range data set;
   computing a measurement utilizing the 3D range data set and based on at least the first feature and the second feature; and
   displaying the computed measurement within at least one of the first image and the second image.

2. The method of claim 1 wherein the computed measurement is displayed in one of the first 2D displayed image only and the second displayed image only.

3. The method of claim 1, where displaying the computed measurement includes displaying at least one of: a measurement point, a plurality of measurement points, a measurement line, a plurality of measurement lines, a measurement surface, a plurality of measurement surfaces, a measurement volume, values, a plurality of values, a plurality of measurement volumes, a measurement feature, and a plurality of measurement features.

4. The method of claim 1, wherein displaying the computed measurement comprises displaying the computed measurement in at least one of the first 2D displayed image, the second displayed image, and a third displayed image.

5. The method of claim 1, wherein the 3D range data set is provided by a 3D rangefinder device comprising at least one of: a scanning laser rangefinder using time of flight range measurement principles, a scanning laser rangefinder using phase comparison range measurement principles, a scanning laser rangefinder using any other range measurement principles, an imaging laser rangefinder range camera using time of flight range measurement principles, an imaging laser rangefinder range camera using phase comparison range measurement principles, an imaging laser rangefinder range camera using any other range measurement principles, a triangulation rangefinder, a stereo image rangefinder, a multiple image rangefinder, any other device that acquires a multiplicity of range data points simultaneously, and any other device that acquires a multiplicity of range data points over a period of time and combinations of the above.

6. The method of claim 1, wherein at least one of the first 2D displayed image and the second displayed image comprises a 2D image, wherein the 2D image comprises one of: a 2D range image comprising range values from the 3D rangefinder device converted to monochrome, a 2D range image comprising range values from the 3D rangefinder device converted to false color, a 2D reflectance image comprising intensity values of a rangefinding signal reflected from a physical surface and thereafter received by the 3D rangefinder device converted to monochrome, a 2D reflectance image comprising intensity values of a rangefinding signal reflected from a physical surface and thereafter received by the 3D rangefinder device converted to false color, a 2D registered color image comprising a color camera image previously registered with 3D range data, a 2D registered color image wherein the image is acquired from the same perspective as the 3D range data set, a 2D registered color image wherein the image is acquired from a different perspective than the 3D range data set, a 2D registered color image wherein the image is acquired with the same resolution as the 3D range data set, a 2D registered color image wherein the image is acquired with different resolution from the 3D range data set, a 2D image displayed in spherical projection format, a 2D image displayed in any other 3D-to-2D projection format, and a 2D registered monochrome image comprising a monochrome camera image previously registered with 3D range data.

7. The method of claim 1, wherein the second displayed image comprises a 3D image, wherein the 3D image comprises one of: a 3D point display, a 3D point display in orthogonal projection, a 3D point display in perspective projection, a 3D polygonal mesh display, a 3D polygonal mesh display in orthogonal projection, a 3D polygonal mesh display in perspective projection, a 3D surface geometry display, a 3D surface geometry display in orthogonal projection, and a 3D surface geometry display in perspective projection.

8. The method of claim 1, wherein computing a measurement utilizing the 3D range data set and based on at least the first feature and the second feature comprises automatically orienting a measurement perpendicularly from a specified surface.

9. The method of claim 1, wherein identifying at least one of the first feature and the second feature comprises at least one of: using a computer cursor controlled by a mouse to identify, using a computer cursor controlled by a pointing stick to identify, using a computer cursor controlled by a joystick to identify, using a computer cursor controlled by a touch pad to identify, and using software to identify.

10. The method of claim 1, wherein at least part of identifying a feature is performed automatically including at least one of: automatically placing a feature restricted to a specified surface, automatically placing a feature in the center of a circular feature, and automatically using combinations of the preceding to identify.

11. The method of claim 1, wherein identifying corresponding features comprises at least one of: using sub-pixel interpolation in any displayed image wherein a software tool may allow the user to estimate and specify the location of a feature anywhere within a pixel and not just at its origin; using interpolation between measured 3D range data points on surfaces in any 3D displayed image wherein a software tool may allow the user to estimate and specify the location of a feature anywhere upon a surface even if that particular location is not directly associated with a measured 3D range data point; using estimates of the centers of features wherein the user may estimate and specify the location of the center of a feature even if the particular pixel at that chosen center appears no different from adjacent pixels; and using holes and data interpolated across holes wherein the rangefinder device did not acquire a range measurement and wherein a software tool may allow the user to estimate and specify the location of a feature anywhere within a hole even though that particular location is not directly associated with a measured 3D range data point.

12. A computer program product comprising computer executable instructions stored in non-transitory computer readable media for execution in at least one processor for making measurements within a 3D range data set obtained using a 3D rangefinder device, the computer executable instructions, when executed by the processor, performing steps comprising:
providing a first 3D range data set obtained using a 3D rangefinder device to the at least one processor;
displaying the 3D range data set as a first image on a display device, wherein the first image comprises one of a 2D image that is generated from the 3D range data set or a 2D image that is registered to the 3D range data set, wherein the 2D image is registered to the 3D data set by identifying corresponding features in the 2D image and the 3D range data set, computing the location and orientation of the device used to capture the 2D image, using the location and orientation of the device used to capture the 2D image to compute the optical path from the device used to capture the 2D image into the 3D data set, and applying the value from each pixel of the 2D image to corresponding points of the 3D data set;
displaying the 3D range data set as a second image on the display device, wherein the second image comprises one of a 3D displayed image, a 2D image that is generated from the 3D range data set, or a 2D image that is registered to the 3D range data set;
identifying, within the first image, at least a first feature within the 3D range data set;
identifying, within the second image, at least a second feature within the 3D range data set, different from the first feature within the 3D range data set;
computing a measurement utilizing the 3D range data set and based on at least the first feature and the second feature; and
displaying the computed measurement within at least one of the first image and the second image.

13. The computer readable medium of claim 12, wherein the displayed computed measurement is displayed in at least one of the first 2D displayed image, the second displayed image, and a third displayed image.

14. The computer readable medium of claim 12, wherein the 3D range data set is provided by a 3D rangefinder device comprising at least one of: a scanning laser rangefinder using time of flight range measurement principles, a scanning laser rangefinder using phase comparison range measurement principles, a scanning laser rangefinder using any other range measurement principles, an imaging laser rangefinder range camera using time of flight range measurement principles, an imaging laser rangefinder range camera using phase comparison range measurement principles, an imaging laser rangefinder range camera using any other range measurement principles, a triangulation rangefinder, a stereo image rangefinder, a multiple image rangefinder, any other device that acquires a multiplicity of range data points simultaneously, and any other device that acquires a multiplicity of range data points over a period of time and combinations of the above.

15. The computer readable medium of claim 12, wherein at least one of the first 2D displayed image and the second displayed image comprises a 2D image, wherein the 2D image comprises one of: a 2D range image comprising range values from the 3D rangefinder device converted to monochrome, a 2D range image comprising range values from the 3D rangefinder device converted to false color, a 2D reflectance image comprising intensity values of a rangefinding signal reflected from a physical surface and thereafter received by the 3D rangefinder device converted to monochrome, a 2D reflectance image comprising intensity values of a rangefinding signal reflected from a physical surface and thereafter received by the 3D rangefinder device converted to false color, a 2D registered color image comprising a color camera image previously registered with 3D range data, a 2D registered color image wherein the image is acquired from the same perspective as the 3D range data set, a 2D registered color image wherein the image is acquired from a different perspective than the 3D range data set, a 2D registered color image wherein the image is acquired with the same resolution as the 3D range data set, a 2D registered color image wherein the image is acquired with different resolution from the 3D range data set, a 2D image displayed in spherical projection format, a 2D image displayed in any other 3D-to-2D projection format, and a 2D registered monochrome image comprising a monochrome camera image previously registered with 3D range data.

16. An apparatus for making measurements within a 3D range data set obtained using a 3D rangefinder device, comprising:
at least one computer processor;
a computer program product comprising computer readable medium having stored thereon computer-executable instructions that, when executing within the at least one computer processor, perform steps comprising:
providing a first 3D range data set obtained using a 3D rangefinder device to the at least one processor;
displaying the 3D range data set as a first image on a display device, wherein the first image comprises one of a 2D image that is generated from the 3D range data set or a 2D image that is registered to the 3D range data set, wherein the 2D image is registered to the 3D data set by identifying corresponding features in the 2D image and the 3D range data set, computing the location and orientation of the device used to capture the 2D image, using the location and orientation of the device used to capture the 2D image to compute the optical path from the device used to capture the 2D image into the 3D data set, and applying the value from each pixel of the 2D image to corresponding points of the 3D data set;

displaying the 3D range data set as a second image on the display device, wherein the second displayed image comprises one of a 3D displayed image, a 2D image that is generated from the 3D range data set, or a 2D image that is registered to the 3D range data set;

identifying, within the first image, at least a first feature within the 3D range data set;

identifying, within the second image, at least a second feature within the 3D range data set, different from the first feature within the 3D range data set;

computing a measurement utilizing the 3D range data set and based on at least the first feature and the second feature; and displaying the computed measurement within at least one of the first image and the second image.

17. The apparatus of claim 16, wherein the displayed computed measurement is displayed in at least one of the first 2D displayed image, the second displayed image, and a third displayed image.

18. The apparatus of claim 16, wherein the 3D range data set is provided by a 3D rangefinder device comprising at least one of: a scanning laser rangefinder using time of flight range measurement principles, a scanning laser rangefinder using phase comparison range measurement principles, a scanning laser rangefinder using any other range measurement principles, an imaging laser rangefinder range camera using time of flight range measurement principles, an imaging laser rangefinder range camera using phase comparison range measurement principles, an imaging laser rangefinder range camera using any other range measurement principles, a triangulation rangefinder, a stereo image rangefinder, a multiple image rangefinder, any other device that acquires a multiplicity of range data points simultaneously, and any other device that acquires a multiplicity of range data points over a period of time and combinations of the above.

19. The apparatus of claim 16, wherein at least one of the first 2D displayed image and the second displayed image comprises a 2D image, wherein the 2D image comprises one of: a 2D range image comprising range values from the 3D rangefinder device converted to monochrome, a 2D range image comprising range values from the 3D rangefinder device converted to false color, a 2D reflectance image comprising intensity values of a rangefinding signal reflected from a physical surface and thereafter received by the 3D rangefinder device converted to monochrome, a 2D reflectance image comprising intensity values of a rangefinding signal reflected from a physical surface and thereafter received by the 3D rangefinder device converted to false color, a 2D registered color image comprising a color camera image previously registered with 3D range data, a 2D registered color image wherein the image is acquired from the same perspective as the 3D range data set, a 2D registered color image wherein the image is acquired from a different perspective than the 3D range data set, a 2D registered color image wherein the image is acquired with the same resolution as the 3D range data set, a 2D registered color image wherein the image is acquired with different resolution from the 3D range data set, a 2D image displayed in spherical projection format, a 2D image displayed in any other 3D-to-2D projection format, and a 2D registered monochrome image comprising a monochrome camera image previously registered with 3D range data.

* * * * *